US007756693B2

(12) United States Patent
Shima et al.

(10) Patent No.: US 7,756,693 B2
(45) Date of Patent: Jul. 13, 2010

(54) OPTIMIZED REAL PARTICLES SIMULATION CALCULATOR WITH ENHANCED PREDICTION ACCURACY

(75) Inventors: Shinichiro Shima, Yokosuka (JP); Kanya Kusano, Yokosuka (JP); Toru Sugiyama, Yokosuka (JP); Akio Kawano, Yokosuka (JP); Shigenobu Hirose, Yokosuka (JP)

(73) Assignee: Japan Agency for Marine-Earth Science and Technology (JP)

( * ) Notice: Subject to any disclaimer, the term of this patent is extended or adjusted under 35 U.S.C. 154(b) by 570 days.

(21) Appl. No.: 11/737,020

(22) Filed: Apr. 18, 2007

(65) Prior Publication Data

US 2007/0250296 A1    Oct. 25, 2007

(30) Foreign Application Priority Data

Apr. 20, 2006    (JP)    ............................. 2006-117064

(51) Int. Cl.
*G06G 7/48* (2006.01)
(52) U.S. Cl. ............................................. 703/6; 703/8
(58) Field of Classification Search ................. 703/6, 703/8
See application file for complete search history.

(56) References Cited

U.S. PATENT DOCUMENTS

| 5,598,359 | A | * | 1/1997 | Montag et al. | ............. | 703/6 |
| 5,630,718 | A | * | 5/1997 | Montag et al. | ............. | 434/2 |
| 7,077,749 | B1 | * | 7/2006 | Wang | ............. | 463/32 |
| 7,269,539 | B2 | * | 9/2007 | Wang | ............. | 703/2 |
| 2006/0100784 | A1 | * | 5/2006 | Wang | ............. | 702/3 |

OTHER PUBLICATIONS

Xia, Cloud Drop Growth by condensation and coalescence in the transition range, Dec. 2000, Bell & Howell Information and Learning Company.*
Maruyama et al., Monte Carlo Simulation of the Formation of Snowflakes, May 2005, pp. 1529-1544.*
Valioulis et al., A Numerical Evaluation of the Stochastic Completeness of the Kenetic Coagulation Equation, 1984, Journal of the Atmosheric Sciences vol. 41-16, pp. 2516-2529.*

(Continued)

*Primary Examiner*—Paul L Rodriguez
*Assistant Examiner*—Aniss Chad
(74) *Attorney, Agent, or Firm*—Fenwick & West LLP

(57) ABSTRACT

A simulator is provided for simulating a real-water-droplet for an arbitrary simulation time in an entire space to be observed in which the real-water-droplets collide by a certain probability within a predetermined volume in a predetermined time interval, and in which the real-water-droplet is specified by a group of an arbitrary number of attributes and position coordinates at an initial time in one of divided spaces into which the entire space is divided, a super-water-droplet representing a group of an arbitrary number of the real-water-droplets which have a predetermined identical group of the attributes, when the multiplicity which is the arbitrary number of the real-water-droplets represented by the super-water-droplet changes when the super-water-droplet collides with another by a probability based on the certain probability and the multiplicity, calculating data about the super-water-droplet to output data about the real-water-droplet after the arbitrary simulation time elapses.

12 Claims, 11 Drawing Sheets

OTHER PUBLICATIONS

Larson et al., Supplying Local Microphysics Parameterizations with Information about Subgrid Variability: Latin Hypercube Sampling, Jun. 2005, Journal of the Atmospheric Sciences vol. 62, 4010-4026.*

K.V. Beard, *Terminal Velocity and Shape of Cloud and Precipitation Drops Aloft*, Department of Meteorology, University of California, Los Angeles, May 1976, pp. 851-864.

Andreas Bott, *A Flux Method for the Numerical Solution of the Stochastic Collection Equation*, Journal of the Atmospheric Sciences, Oct. 20, 1997, pp. 2284-2293, vol. 55.

Andreas Bott, *A Flux Method for the Numerical Solution of the Stochastic Collection Equation: Extension to Two-Dimensional Particle Distributions*, Journal of the Atmospheric Sciences, Feb. 24, 1999, pp. 284-294, vol. 57.

Milford H. Davis, *Collisions of Small Cloud Droplets: Gas Kinetic Effects*, National Center for Atmospheric Research, Jul. 1972, pp. 911-915.

Daniel T. Gillespie, *An Exact Method for Numerically Simulating the Stochastic Coalescence Process in a Cloud*, Earth & Planetary Sciences Division, Naval Weapons Center, Oct. 1975, pp. 1977-1989.

William D. Hall, *A Detailed Microphysical Model Within a Two-Dimensional Dynamic Framework: Model Description and Preliminary Results*, Journal of the Atmospheric Sciences, Jun. 3, 1980, pp. 2486-2507, vol. 37.

P.R. Jonas, *The Collision Efficiency of Small Drops*, Correspondence, pp. 681-683, 1972.

E. Kessler, *On the continuity and distribution of water substance in atmospheric circulations*, Atmospheric Research, 1995, pp. 109-145, vol. 38, Elsevier.

Barry H. Lynn et al, *Spectral (Bin) Microphysics Coupled with a Meoscale Model (MM5). Part I: Model Description and First Results*, Monthly Weather Review, Jun. 21, 2004, pp. 44-58, vol. 133.

Masataka Murakami, *Numerical Modeling of Dynamical and Microphysical Evolution of an Isolated Convective Cloud—The Jul. 1981 CCOPE Cloud-*, Meteorological Research Institute, Apr. 1990, pp. 107-122, vol. 68. No. 2.

R.Rogers et al, *A Short Course in Cloud Physics—3$^{rd}$ Edition*, 1989, pp. 81-120, Pergamon Press, Great Britain.

M. Seeburg et al, *Stochastic simulations as a benchmark for mathematical methods solving the coalescence equation*, Atmospheric Research, 1996, pp. 33-48, vol. 40, Elsevier.

* cited by examiner

SUPER-WATER-DROPLET WITH MULTIPLICITY OF 3

REAL-WATER-DROPLET

US 7,756,693 B2

OPTIMIZED REAL PARTICLES SIMULATION CALCULATOR WITH ENHANCED PREDICTION ACCURACY

CROSS REFERENCE TO RELATED APPLICATIONS

This application claims the foreign priority benefit under Title 35, United States Code, §119(a)-(d) of Japanese Patent Application No. 2006-117064, filed on Apr. 20, 2006 in the Japan Patent Office, the disclosure of which is herein incorporated by reference in its entirety.

BACKGROUND OF THE INVENTION

1. Field of the Invention

The invention relates to a simulation method, a simulation program, and a simulator which simulate a change of a particle, a droplet, or a water-droplet over elapsed time.

2. Description of the Related Art

Conventionally, a numerical simulation is performed by a computer to analyze significantly complicated physical laws which rule natural phenomena such as a cloud formation, a rainfall, a snowfall, a thunderstrike, and so on. By virtue of improvement of analysis accuracy in the numerical simulation, natural phenomena which have actually occurred are accurately reproduced on a computer, and natural phenomena which are to occur in the future are accurately predicted.

In general, in such a numerical simulation, to analyze extremely complicated physical laws which rule the natural phenomena, the natural phenomena are grouped into two processes to be processed by a computer. One of the two processes is a cloud dynamics process which processes air flow while the other process is a cloud microphysics process which processes a movement and a change in a state of a water-droplet which constructs a cloud or rainfall. By the way, these processes influence each other.

A fluid dynamics model, which is a conventional method, is used to simulate the cloud dynamics process. In the simulation of the cloud dynamics process, calculation accuracy is swiftly improved by virtue of fast progresses in computer technologies.

On the other hand, in the simulation of the cloud microphysical process, a cloud is formed of a great number, such as approximately $10^9$, of water-droplets per cubic meter. Therefore, in present and future, it is and will be impossible for a computer to exactly calculate all the cloud microphysics processes.

In view of the above, in present, a roughly approximated model is used to numerically simulate the cloud microphysics processes. Here, concerning to the simulation of the cloud microphysics processes, there will be specifically described conventional methods (an exact Monte Carlo method, an enhanced Monte Carlo method, a bin method, and a bulk parameterization method).

In the exact Monte Carlo method (see D. T. Gillespie, "An Exact Method for Numerically Simulating the Stochastic Coalescence Process in a Cloud", J. Atoms. Sci., 32, 1977 (1975)), numeric values generated at random are used to simulate a probability of collision between water-droplets in a cloud. Thus, it is theoretically possible to accurately simulate the cloud microphysics processes. However, a great deal of data storage space and computational cost is required. The exact Monte Carlo method has been greatly improved (referred to as an "improved Monte Carlo method" hereafter, see M. See Belberg, T. Trautmann, and M. Thorn "Stochastic simulations as a benchmark for mathematical methods solving the coalescence equation", Atmos. Res., 40, 33 (1996)"). The improved Monte Carlo method requires no huge data storage space but still a great deal of computational cost.

Here, description will be given, about an approximate computation time in the great deal of computational cost taken by the exact Monte Carlo method and the improved Monte Carlo method. According to "Stochastic simulations as a benchmark for mathematical methods solving the coalescence equation", a computer at that time took 5.5 hours to simulate phenomena in a space of 50 [$m^3$] for 20 minutes.

Accordingly, assuming that phenomena in a space of at least approximately $10^3$ [$km^3$]=$10^{12}$ [$m^3$] needs to be simulated for approximately two hours to calculate phenomena of a cloud formation and precipitation, the computer takes $6.6 \times 10^{11}$ hours=$7.5 \times 10^7$ years. Performance of a computer is supposed to continue to be improved by 100 times faster per 10 years. Then, the computer will be able to simulate the phenomena at a reasonable computational cost as long as 50 years later.

In the bin method (see A. Bott, "A Flux Method for the Numerical Solution of the Stochastic Collection Equation", J. Atoms. Sci., 55, 2284 (1998) and A. Bott, "A Flux Method for the Numerical Solution of the Stochastic Collection Equation: Extension to Two-Dimensional Particle Distributions", J. Atoms. Sci., 57, 284 (2000)), the water-droplets in a space where a cloud is formed are processed not individually but as a distribution function. Thus, the water-droplets are modeled into a bin model in which different distribution functions are obtained corresponding to different attributes (properties) of the water-droplets for calculation. Concerning to the bin method, the present computer can numerically simulate the microphysics processes of the cloud formation in a sufficient scale. In the bin method, since the water-droplets are not individually processed, it is not always possible to accurately express phenomena caused by a particulate property of the water-droplets.

Moreover, in the bin method, the water-droplets are processed as a distribution function. Therefore, to improve accuracy in the present bin model and increase the number of attributes of the water-droplets, it is expected to require a higher dimensional distribution function and more huge computational cost and data storage space. Assuming that the attributes of the water-droplet include only a radius R[m] of the water-droplet, merely one-dimensional distribution function is required for the simulation. By the way, the distribution function is a number density distribution function f(R), for instance. Here, f(R)dR is defined as the number of water-droplets which have a radius between R and R+dR.

Next, a case will be described, in which a plurality of attributes of the water-droplet are processed using the bin method to further improve accuracy in the simulation. For instance, there are assumed to be seven attributes including the radius R of the water-droplet, a velocity of the water-droplet (three elements in x, y, and z directions), a mass of a cloud condensation nucleus such as NaCl dissolved in the water-droplet, a temperature of the water-droplet, and an electricity charged in the water-droplet. In the bin method, in theory, when the number of attributes is increased to 7, a 7-dimensional distribution function needs to be processed. Processing the 7-dimensional distribution function requires 6th power of the data storage space and 12th power of computation time as compared with a case of processing the one-dimensional distribution function.

In general, in the bin method, a d-th dimensional distribution function is assumed to be processed. Then, a micro-scale parameter proportional to a width of a bin for each dimension of the distribution function is defined as $\epsilon$. The micro-scale parameter $\epsilon$ expresses how accurate the simulation is. The smaller the value of the micro-scale parameter $\epsilon$ is, the more accurate the simulation is. Thus, in the bin method, a required size of the data storage area is proportional to $(1/\epsilon)^d$ while a required computation time is proportional to $(1/\epsilon)^{2d}$. As a result, the computation time dramatically increases as the dimension d of the distribution function increases so that it is expected that the simulation becomes difficult. In addition, in the bin method, in a case of processing not only a water-droplet in a liquid phase but also a snow, a hail, and so on in a solid phase, the number of attributes further increases so as to make the simulation even more difficult.

Presently, the bulk parameterization method (see E. Kessler, "On the Distribution and Continuity of Water Substance in Atmospheric Circulations", Met. Monograph, Vol. 10, No. 32, American Meteorological Society, Boston, 84 pp and M. Murakami, "Numerical Modeling of Dynamical and Microphysical Evolution of an Isolated Convective Cloud", J. Meteor. Soc. Japan, 68, 107 (1990)) is a mainstream method in which the cloud dynamics process is combined with the cloud microphysics process to simulate natural phenomena such as a cloud formation and a rainfall. The bulk parameterization method is characterized in greatly simplified parameters which expresses the cloud microphysics process. The parameters are adjusted to approximately reproduce the phenomena. Thus, the cloud microphysics process is incorporated into the cloud dynamics process. Therefore, it is impossible to directly calculate changes in a state of the cloud using the bulk parameterization method. Consequently, it is impossible to predict with high accuracy the natural phenomena (unpredictable weather conditions) which variously change.

As described above, how to process the cloud microphysics process is one of important issues in researches of meteorology and climatology. Moreover, a method (see B. H. Lynn, et al., "Spectral (Bin) Microphysics Coupled with a Mesoscale Model (MM5). Part I: Model Description and First Results", Mon. Wea. Rev., 133, 44 (2005)) is being examined, in which the cloud microphysics process modeled by the bin method is coupled with the cloud dynamics process.

However, there are problems respectively in the above-described techniques. To be concrete, in the exact Monte Carlo method and the improved Monte Carlo method, there is a problem that too long time is taken for computation. In the bin method, there are a lot of problems such as inaccuracy due to the water-droplets processed as the distribution function, difficulty of enhancement due to computation time which dramatically increases as the number of attributes increases, and so on. In the bulk parameterization method, the cloud microphysics process is greatly simplified so that the computation time can be reduced. However, there is a problem that it is impossible to predict with high accuracy the natural phenomena (unpredictable weather conditions) which variously change.

In view of the above, it is an object of the present invention to provide a simulation method, a simulation program, and a simulator which solve the above-described problems, reduce computation time, prevent the computation time from increasing even when the number of attributes of the object increases, without processing an object including a water-droplet as a distribution function, and predict various natural phenomena with high accuracy.

SUMMARY OF THE INVENTION

To solve the above-described problems, in a first aspect of the present invention, there is provided a simulation method for simulating a real-particle for an arbitrary simulation time in an observation space in which the real-particles collide with one another by a certain probability within a volume of a predetermined cell in a predetermined time interval, in which the real-particle is specified by a group of an arbitrary number of attributes, a velocity which is one of the attributes at an initial time, and position coordinates in the observation space at the initial time, and which is filled with fluid which is characterized by an arbitrary number of fluid field variables which are expressed by functions of a time elapsed from the initial time and the observation space.

In an input step, the simulation method inputs, as initial variables, the initial time, a group of attributes of a super-particle, a total number of the super-particles, the volume, a velocity of the super-particle, position coordinates of the super-particle, and the fluid variables, the super-particle representing a group of an arbitrary number of the real-particles which have a predetermined identical group of the arbitrary number of attributes. Next, in a calculation step, the simulation method calculates, based on the input initial variables, the group of attributes, the velocity, the position coordinates, and a multiplicity of the super-particle, and the total number of the super-particles after the super-particles collide with one another, the multiplicity which is the arbitrary number of the real-particles represented by the super-particle changing when the super-particle collides with another super-particle by a probability which is specified based on the certain probability by which the real-particles collide with one another within the volume in the predetermined time interval and the multiplicity of the super-particle, using a time evolution equation of attributes which determines a motion of the real-particle by the group of attributes over the time in accordance with the volume, the velocity, the position coordinates, and the fluid field variables, a time evolution equation of position coordinates which determines relationship between the velocity and the position coordinates of the real-particle, and a Monte Carlo calculation in which the super-particles collide with one another by the probability in the predetermined time interval. Moreover, in the calculation step, the simulation method calculates the fluid field variables using a time evolution equation of fluid field which determines a change in the fluid in accordance with the fluid field variables, the group of attributes, the velocity, the position coordinates, and the multiplicity of the super-particle and the total number of the super-particles. Then, in an output step, the simulation method outputs, after repeating the calculation step to calculate the group of attributes, the velocity, the position coordinates, and the multiplicity of the super-particle, and the total number of the super-particles until the arbitrary simulation time elapses, results of repeating the calculation step as the group of attributes, the velocity, and the position coordinates of the real-particle, a total number of the real-particles, and the fluid field variables after the arbitrary simulation time elapses.

In a second aspect of the present invention, there is provided a computer readable storage medium storing a simulation program for causing a computer to simulate a real-particle for an arbitrary simulation time in an observation space in which the real-particles collide with one another by a certain probability within a volume of a predetermined cell in a predetermined time interval, in which the real-particle is specified by a group of an arbitrary number of attributes, a velocity which is one of the attributes at an initial time, and position coordinates in the observation space at the initial time, and which is filled with fluid which is characterized by an arbitrary number of fluid field variables which are expressed by functions of a time elapsed from the initial time and the observation space.

As an input, the simulation program inputs, as initial variables, the initial time, a group of attributes of a super-particle, a total number of the super-particles, the volume, a velocity of the super-particle, position coordinates of the super-particle, and the fluid variables, the super-particle representing a group of an arbitrary number of the real-particles which have a predetermined identical group of the arbitrary number of attributes. Next, as a calculator, the simulation program calculates, based on the input initial variables, the group of attributes, the velocity, the position coordinates, and a multiplicity of the super-particle and the total number of the super-particles after the super-particles collide with one another, the multiplicity which is the arbitrary number of the real-particles represented by the super-particle changing when the super-particle collides with another super-particle by a probability which is specified based on the certain probability by which the real-particles collide with one another within the volume in the predetermined time interval and the multiplicity of the super-particle, using a time evolution equation of attributes which determines a motion of the real-particle by the group of attributes over the time in accordance with the volume, the velocity, the position coordinates, and the fluid field variables, a time evolution equation of position coordinates which determines relationship between the velocity and the position coordinates of the real-particle, and a Monte Carlo calculation in which the super-particles collide with one another by the probability in the predetermined time interval. Moreover, as a calculator, the simulation program calculates the fluid field variables using a time evolution equation of fluid field which determines a change in the fluid in accordance with the fluid field variables, the group of attributes, the velocity, the position coordinates, and the multiplicity of the super-particle, and the total number of the super-particles. Then, as an output, the simulation program outputs, after repeating calculation by the calculator to calculate the group of attributes, the velocity, the position coordinates, and the multiplicity of the super-particle and the total number of the super-particles until the arbitrary simulation time elapses, results of repeating the calculation by the calculator as the group of attributes, the velocity, the position coordinates, and the multiplicity of the real-particle, a total number of the real-particles, and the fluid field variables after the arbitrary simulation time elapses.

In a third aspect of the present invention, there is provided simulator for simulating a real-particle for an arbitrary simulation time in an observation space in which the real-particles collide with one another by a certain probability within a volume of a predetermined cell in a predetermined time interval, in which the real-particle is specified by a group of an arbitrary number of attributes, a velocity which is one of the attributes at an initial time, and position coordinates in the observation space at the initial time, and which is filled with fluid which is characterized by an arbitrary number of fluid field variables which are expressed by functions of a time elapsed from the initial time and the observation space.

Through an input, the simulator inputs, as initial variables, the initial time, a group of attributes of a super-particle, a total number of the super-particles, the volume, a velocity of the super-particle, position coordinates of the super-particle, and the fluid variables, the super-particle representing a group of an arbitrary number of the real-particles which have a predetermined identical group of the arbitrary number of attributes. Next, a calculator calculates, based on the input initial variables, the group of attributes, the velocity, the position coordinates, and a multiplicity of the super-particle and the total number of the super-particles after the super-particles collide with one another, the multiplicity which is the arbitrary number of the real-particles represented by the super-particle changing when the super-particle collides with another super-particle by a probability which is specified based on the certain probability by which the real-particles collide with one another within the volume in the predetermined time interval and the multiplicity of the super-particle, using a time evolution equation of attributes which determines a motion of the real-particle over the time by the group of attributes in accordance with the volume, the velocity, the position coordinates, and the fluid field variables, a time evolution equation of position coordinates which determines relationship between the velocity and the position coordinates of the real-particle, and a Monte Carlo calculation in which the super-particles collide with one another by the probability in the predetermined time interval. Moreover, the calculator calculates the fluid field variables using a time evolution equation of fluid field which determines a change in the fluid in accordance with the fluid field variables, the group of attributes, the velocity, the position coordinates, and the multiplicity of the super-particle, and the total number of the super-particles. Then, an output outputs, after repeating calculation by the calculator to calculate the group of attributes, the velocity, the position coordinates, and the multiplicity of the super-particle and the total number of the super-particles until the arbitrary simulation time elapses, results of repeating the calculation by the calculator as the group of attributes, the velocity, the position coordinates, and the multiplicity of the real-particle, a total number of the real-particles, and fluid field variables after the arbitrary simulation time elapses.

In a forth aspect of the present invention, there is provided a simulation method for simulating a real-water-droplet for an arbitrary simulation time in an entire space to be observed in which the real-water-droplets collide with one another by a certain probability within a predetermined volume in a predetermined time interval, and in which the real-water-droplet is specified by a group of an arbitrary number of attributes and position coordinates at an initial time in one of divided spaces into which the entire space is divided.

In an input step, the simulation method inputs, as initial variables, the initial time, a group of attributes of a super-water-droplet, a total number of the super-water-droplets, a volume of the entire space, a volume of the divided space, position coordinates of the super-water-droplet, and ambient condition data which are data relating to ambient conditions of the real-water-droplet in the divided space, the super-water-droplet representing a group of an arbitrary number of the real-water-droplets which have a predetermined identical group of the arbitrary number of attributes. Next, in a calculation step of microphysics model, the simulation method calculates, based on the group of attributes of the super-water-droplet, the total number of the super-water-droplets, the volume of the entire space, and the volume of the divided space, changes of the position coordinates of the super-water-droplet caused by a motion of the super-water-droplet in the entire space, a change of a volume of liquid water caused by a condensational growth of the super-water-droplet, and changes of the group of attributes and a multiplicity of the super-water-droplet and the total number of the super-water-droplets caused by a collision-coalescence between the super-water-droplets, the multiplicity which is the arbitrary number of the real-water-droplets represented by the super-water-droplet changing when the super-water-droplet collides with another super-water-droplet by a probability which is specified based on the certain probability by which the real-water-droplets collide with one another within the volume in the predetermined time interval and the multiplicity of the super-particle, to obtain a mass of the real-water-droplet based on the changes of the super-water-droplet, and amounts of interaction from the super-water-droplet to an atmosphere based on the mass of the real-water-droplet. Here, the amounts of interaction include a mass of liquid water per unit space volume and a mass of water which evaporates in a unit time, per unit space volume. Moreover, in a calculation step of fluid dynamics model, the simulation method calculates, based on the amounts of interaction calculated in the calculation step of microphysics model and the ambient condition data, a fluid dynamics process of the atmosphere in which the real-water-droplet exists, and feeds back the calculated fluid dynamics process of the atmosphere to the calculation step of microphysics model. Then, in an output step, the simulation method outputs, after repeating the calculation step of microphysics model and the calculation step of fluid dynamics model until the arbitrary simulation time elapses, results of repeating the calculation steps as data relating to the real-water-droplet and the ambient condition data after the arbitrary simulation time elapses.

In a fifth aspect of the present invention, there is provided a computer readable storage medium storing a simulation program for causing a computer to simulate a real-water-droplet for an arbitrary simulation time in an entire space to be observed in which the real-water-droplets collide with one another by a certain probability within a predetermined volume in a predetermined time interval, and in which the real-water-droplet is specified by a group of an arbitrary number of attributes and position coordinates at an initial time in one of divided spaces into which the entire space is divided.

As an input, the simulation program inputs, as initial variables, the initial time, a group of attributes of a super-water-droplet, a total number of the super-water-droplets, a volume of the entire space, a volume of the divided space, position coordinates of the super-water-droplet, and ambient condition data which are data relating to ambient conditions of the real-water-droplet in the divided space, the super-water-droplet representing a group of an arbitrary number of the real-water-droplets which have a predetermined identical group of the arbitrary number of attributes. Next, as a calculator of microphysics model, the simulation program calculates, based on the group of attributes of the super-water-droplet, the total number of the super-water-droplets, the volume of the entire space, and the volume of the divided space, changes of the position coordinates of the super-water-droplet caused by a motion of the super-water-droplet in the entire space, a change of a volume of liquid water caused by a condensational growth of the super-water-droplet, and changes of the group of attributes and a multiplicity of the super-water-droplet and the total number of the super-water-droplets caused by a collision-coalescence between the super-water-droplets, the multiplicity which is the arbitrary number of the real-water-droplets represented by the super-water-droplet changing when the super-water-droplet collides with another super-water-droplet by a probability which is specified based on the certain probability by which the real-water-droplets collide with one another within the volume in the predetermined time interval and the multiplicity of the super-particle, to obtain a mass of the real-water-droplet based on the changes of the super-water-droplet, and amounts of interaction from the super-water-droplet to an atmosphere based on the mass of the real-water-droplet. Moreover, as a calculator of fluid dynamics model, the simulation program calculates, based on the amounts of interaction calculated in the calculation step of microphysics model and the ambient condition data, a fluid dynamics process of the atmosphere in which the real-water-droplet exists, and feeds back the calculated fluid dynamics process of the atmosphere to the calculator of microphysics model. Then, as an output the simulation program outputs, after repeating calculation by the calculator of microphysics model and the calculator of fluid dynamics model until the arbitrary simulation time elapses, results of repeating the calculation by the calculator of microphysics model and the calculator of fluid dynamics model as data relating to the real-water-droplet and ambient condition data after the arbitrary simulation time elapses.

In the simulation program, the calculator of microphysics model may include a calculator of motion of super-water-droplet, a calculator of condensational growth of super-water-droplet, and a calculator of collision-coalescence of super-water-droplets.

In the simulation program with such a configuration, the calculator of motion of super-water-droplet of the calculator of microphysics model may calculate a terminal velocity assuming that in a state where a gravity and an air resistance are in balance on the super-water-droplet, motion of the super-water-droplet changes in accordance with a wind velocity, and the super-water-droplet moves at the terminal velocity which is relatively constant with respect to the wind velocity. Moreover, in the simulation program, the calculator of condensational growth of super-water-droplet of the calculator of microphysics model may calculate a volume of liquid water assuming that the volume of liquid water contained in the super-water-droplet changes in accordance with a humidity included in the ambient condition data. Then, in the simulation program, the calculator of collision-coalescence of super-water-droplets of the calculator of microphysics model may calculate the group of attributes and the multiplicity of the super-water-droplet and the total number of the super-water-droplets after the collision-coalescence between the super-water-droplets as a collision-coalescence process by making a predetermined number of pairs of the super-water-droplets which collide with one another, the predetermined number being decreased from a number of all possible combinations of pairs of the super-water-droplets, and by using a probability that each of the predetermined number of pairs of the super-water-droplets collide with one another, the probability being increased by a predetermined width from a probability that each of the all possible combinations of pairs of the super-water-droplets collide with one another.

In the simulation program, the calculator of collision-coalescence of super-water-droplets may calculate the collision-coalescence process in accordance with a numerical simulation using a Monte Carlo method.

In the simulation program with such a configuration, the calculator of collision-coalescence of super-water-droplets may generate a random number in practice to make the super-water-droplets collide and coalesce in the divided space in order to calculate the collision-coalescence process using the Monte Carlo method.

In a further aspect of the present invention, there is provided a simulator for simulating a real-water-droplet for an arbitrary simulation time in an entire space to be observed in which the real-water-droplets collide with one another by a certain probability within a predetermined volume in a predetermined time interval, and in which the real-water-droplet is specified by a group of an arbitrary number of attributes and position coordinates at an initial time in one of divided spaces into which the entire space is divided.

In the simulator, an input inputs, as initial variables, the initial time, a group of attributes of a super-water-droplet, a total number of the super-water-droplets, a volume of the entire space, a volume of the divided space, position coordinates of the super-water-droplet, and ambient condition data which are data relating to ambient conditions of the realwater-droplet in the divided space, the super-water-droplet representing a group of an arbitrary number of the real-water-droplets which have a predetermined identical group of the arbitrary number of attributes. Next, a calculator of microphysics model calculates, based on the group of attributes of the super-water-droplet, the total number of the super-water-droplets, the volume of the entire space, and the volume of the divided space, changes of the position coordinates of the super-water-droplet caused by a motion of the super-water-droplet in the entire space, a change of a volume of liquid water caused by a condensational growth of the super-water-droplet, and changes of the group of attributes and a multiplicity of the super-water-droplet and the total number of the super-water-droplets caused by a collision-coalescence between the super-water-droplets, the multiplicity which is the arbitrary number of the real-water-droplets represented by the super-water-droplet changing when the super-water-droplet collides with another super-water-droplet by a probability which is specified based on the certain probability by which the real-water-droplets collide with one another within the volume in the predetermined time interval and the multiplicity of the super-particle, to obtain a mass of the real-water-droplet based on the changes of the super-water-droplet, and amounts of interaction from the super-water-droplet to an atmosphere based on the mass of the real-water-droplet. Moreover, a calculator of fluid dynamics model calculates, based on the amounts of interaction calculated in the calculation step of microphysics model and the ambient condition data, a fluid dynamics process of the atmosphere in which the real-water-droplet exists, and feeds back the calculated fluid dynamics process of the atmosphere to the calculator of microphysics model. Then, an output outputs, after repeating calculation by the calculator of microphysics model and the calculator of fluid dynamics model until the arbitrary simulation time elapses, results of repeating the calculation by the calculator of microphysics model and the calculator of fluid dynamics model as data relating to the real-water-droplet and ambient condition data after the arbitrary simulation time elapses.

In the simulator, the calculator of microphysics model may include a calculator of motion of super-water-droplet, a calculator of condensational growth of super-water-droplet, and a calculator of collision-coalescence of super-water-droplets.

In the simulator with such a configuration, the calculator of motion of super-water-droplet of the calculator of microphysics model may calculate a terminal velocity assuming that in a state where a gravity and an air resistance are in balance on the super-water-droplet, motion of the super-water-droplet changes in accordance with a wind velocity, and the super-water-droplet moves at the terminal velocity which is relatively constant with respect to the wind velocity. Moreover, in the simulation program, the calculator of condensational growth of super-water-droplet of the calculator of microphysics model may calculate a volume of liquid water assuming that the volume of liquid water contained in the super-water-droplet changes in accordance with a humidity included in the ambient condition data. Then, in the simulation program, the calculator of collision-coalescence of super-water-droplets of the calculator of microphysics model may calculate the group of attributes and the multiplicity of the super-water-droplet and the total number of the super-water-droplets after the collision-coalescence between the super-water-droplets as a collision-coalescence process by making a predetermined number of pairs of the super-water-droplets which collide with one another, the predetermined number being decreased from a number of all possible combinations of pairs of the super-water-droplets, and by using a probability that each of the predetermined number of pairs of the super-water-droplets collide with one another, the probability being increased by a predetermined width from a probability that each of the all possible combinations of pairs of the super-water-droplets collide with one another.

In the simulator, the calculator of collision-coalescence of super-water-droplets may calculate the collision-coalescence process in accordance with a numerical simulation using a Monte Carlo method.

In the simulator with such a configuration, the calculator of collision-coalescence of super-water-droplets generates a random number in practice to make the super-water-droplets collide and coalesce in the divided space in order to calculate the collision-coalescence process using the Monte Carlo method.

BRIEF DESCRIPTION OF THE DRAWINGS

The object and features of the present invention will become more readily apparent from the following detailed description taken in conjunction with the accompanying drawings in which.

DESCRIPTION OF THE PREFERRED EMBODIMENTS

Here will be described embodiments of the present invention in detail, referring to the accompanying drawings as needed.

(Configuration of Simulator)

Figure 1:
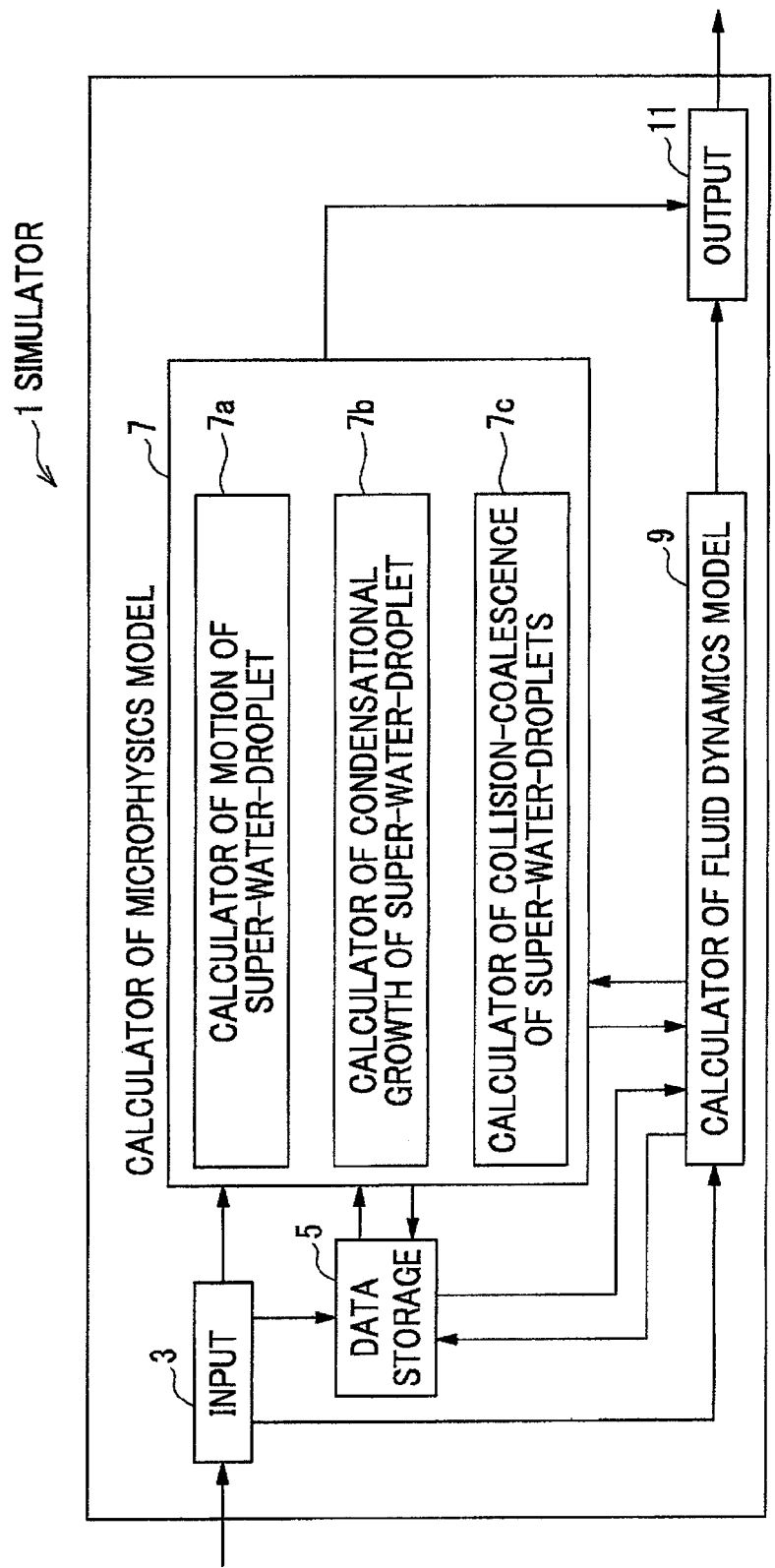
FIG. 1 is a block diagram of a simulator according to an embodiment of the present invention.

FIG. 1 is a block diagram of a simulator. As shown in FIG. 1, focusing on a water-droplet which is one form of a real-particle, the simulator 1 simulates changes in the water-droplet over elapsed time in an entire observed space using a super-water-droplet-based model in which a plurality of water-droplets which have an identical group of attributes is processed as a super-water-droplet in order to predict natural phenomena such as a cloud formation, a rainfall, and so on. The simulator 1 includes an input (an input means) 3, a data storage (a data storage means) 5, a calculator of microphysics model (a calculation means of microphysics model) 7, a calculator of fluid dynamics model (a calculation means of fluid dynamics model) 9, and an output (an output means) 11

First of all, description will be given, about a super-water-droplet and a super-water-droplet-based model processed by the simulator 1. The super-water-droplet is defined as a group of an arbitrary number of real-water-droplets which have an identical group of attributes. In this case, the "group of attributes of the real-water-droplet" is assumed to include physical quantities of each of the real-water-droplets such as, for instance, a size, a quantity and a type of a cloud condensation nucleus, an electric charge, a velocity, a temperature, and so on of the real-water-droplet. In other words, the super-water-droplet includes the arbitrary number of real-water-droplets. And, a multiplicity n expresses the arbitrary number where n is an integer 0, 1, 2, 3, . . . . For instance, computation times which are taken to calculate about the super-water-droplets with multiplicities n of 5, 100, and 400,000, are respectively $1/5$, $1/100$, and $1/400,000$ compared with a computation time which is taken to individually calculate about all the real-water-droplets. In other words, the larger the multiplicity n is, the shorter the computation time is.

Moreover, the super-water-droplets keep moving freely in the entire space similarly to the real-water-droplets in accordance with wind and the gravity. It is assumed that a super-water-droplet is present at a time t at a certain point of $\vec{r}(t)[m]$ in the entire space and that the entire space is divided into grids (divided spaces) with appropriate sizes. Here, three elements of x, y, and z coordinates are specified to determine $\vec{r}(t)[m]$, which is a vector $r=(x, y, z)$. Here, the vector r is expressed by $\vec{r}$. It is supposed that n real-water-droplets, which are expressed by the super-water-droplet, are randomly and uniformly distributed in the divided space which includes $\vec{r}(t)[m]$. The correspondence between the real-water-droplets and the super-water-droplet is schematically shown FIG. 2.

Figure 2A:
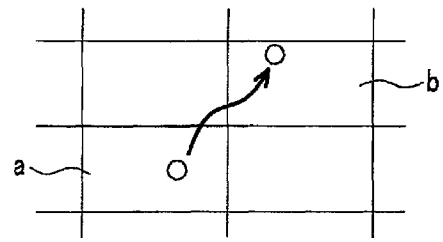
FIG. 2 is a schematic diagram showing relationship between a super-water-droplet and a real-water-droplet.
Figure 2B:
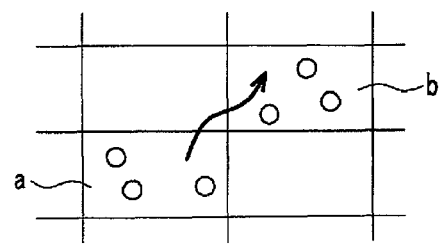

When the super-water-droplet with the multiplicity of 3 moves from the divided space a to the divided space b as shown in FIG. 2A, the 3 real-water-droplets similarly move from the divided space a to the divided space b as shown in FIG. 2B. Comparing FIG. 2A with FIG. 2B, the three real-water-droplets only need to be in the divided space a before moving and in the divided space b after moving. The actual coordinate position of each of the real-water-droplets does not matter as long as the real-water-droplet is located within the divided spaces a and b.

In the super-water-droplet-based model, such super-water-droplets freely migrate (move) in the entire space, collide and combine (collide and coalesce) with one another by a certain probability (details will be described later) and turn to be new super-water-droplets.

In the embodiment, not only a process in which the super-water-droplets collide and coalesce with one another, but also a process in which the super-water-droplet grows by condensation is included in the super-water-droplet-based model. In addition, the embodiment also includes a scheme to reduce a time taken to calculate a process of motion of the super-water-droplet. Here, general description will be given to a motion, a condensational growth, and a collision-coalescence of the super-water-droplets in the super-water-droplet-based model (details will be described in a section of a calculator of microphysics model 7).

The real-water-droplets in the entire space are subject to the gravity and air resistance from the atmosphere. Thus, a motion of the real-water-droplet time-evolves in accordance with a common equation of motion. Similarly, the motion of the super-water-droplet time-evolves in accordance with the common equation of motion.

The condensational growth of the super-water-droplet follows a law which determines how the real-water-droplet in the entire space absorbs or releases water vapor in the atmosphere in accordance with a quantity of cloud condensation nucleus and ambient humidity. Accordingly, it is possible to directly calculate the condensational growth of the super-water-droplet in accordance with the law, similarly.

As for the collision-coalescence of the super-water-droplets, at first, it is assumed that the super-water-droplet with the multiplicity of $n_j$ collides and coalesces with the super-water-droplet with the multiplicity of $n_k$ ($>n_j$). Then, it is expected that the super-water-droplet with the multiplicity of $n_k-n_j$ and the super-water-droplet with the multiplicity of $n_j$ are newly formed.

Next, it is assumed that the super-water-droplet with the multiplicity of $n_j$ collides and coalesces with the super-water-droplet with the multiplicity of $n_k$ ($=n_j$). In this case, it is not expected that the super-water-droplet with the multiplicity of $n_k-n_j=0$ and the super-water-droplet with the multiplicity of $n_j$ are formed. However, it is expected that the super-water-droplet with the multiplicity of "$[n_j/2]$" and the super-water-droplet with the multiplicity of $n_j-$"$[n_j/2]$" are formed. Here, "$[n_j/2]$" is a maximum integer which does not exceed $n_j/2$. Hereafter, "[ ]" expresses Gaussian symbol in the specification (merely [ ] are used without the double quotations in EXPRESSIONS).

For instance, two super-water-droplets with an identical multiplicity of 6 collide and coalesce with one another to form six real-water-droplets. Therefore, it is expected that the real-water-droplets are divided into half and half to form two super-water-droplets with a multiplicity of 3. Moreover, it is also expected that two super-water-droplets with an identical multiplicity of 5 collide and coalesce with one another to form a super-water-droplet with a multiplicity of 3 and a super-water-droplet with a multiplicity of 2.

Figure 3:
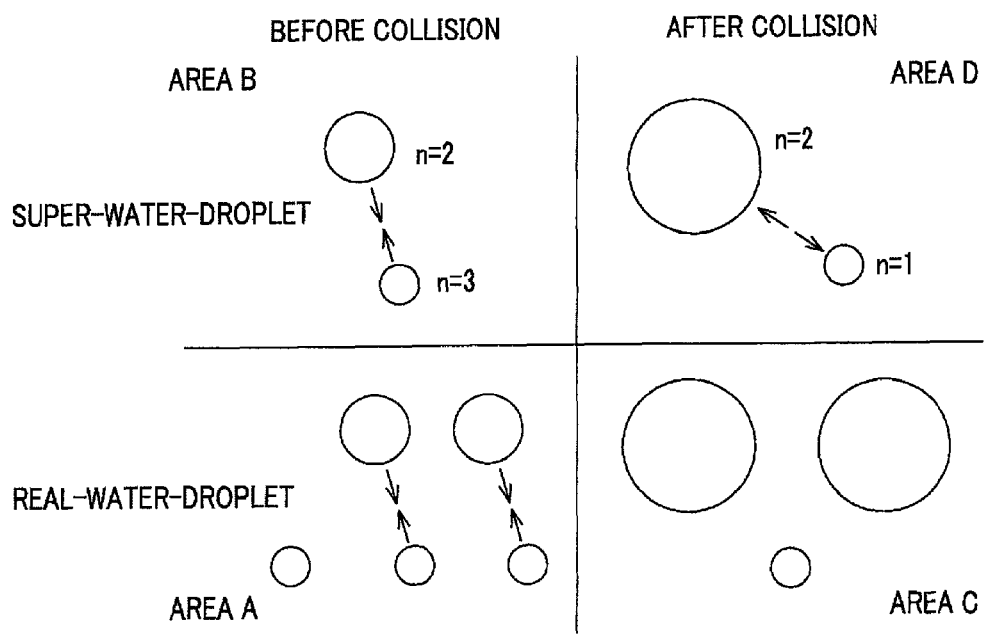
FIG. 3 is a schematic diagram showing correspondence between collision-coalescences of the super-water-droplets and the real-water-droplets.

FIG. 3 shows how the super-water-droplets collide and coalesce with one another. FIG. 3 shows: in AREA A, real-water-droplets before collision (collision between 2 real-water-droplets and 3 real-water-droplets), in AREA B, super-water-droplets before collision (collision between a super-water-droplet with a multiplicity of 2 and a super-water-droplet with a multiplicity of 3), in AREA C, the real-water-droplets after the collision, and in AREA D, the super-water-droplets after the collision.

A random number is generated based on a probability by which the real-water-droplets collide and coalesce with one another in the identical divided space, in order to calculate the collision-coalescence process of the super-water-droplets.

The multiplicity of each of the super-water-droplets is calculated and specified based on an input total number of the super-water-droplets and in such a way that a distribution function which expresses a distribution of the super-waterdroplets is equivalent to a distribution function which expresses a distribution of the real-water-droplets with respect to an arbitrary attribute.

Here, there are described super-particles and a super-particle method which uses the super-particles. Similarly to the super-water-droplets, the multiplicity of each of the super-particles is calculated and specified based on an input total number of the super-particles and in such a way that a distribution function which expresses a distribution of the super-particles is equivalent to a distribution function which expresses a distribution of the real-particles with respect to an arbitrary attribute. The distribution function of the real-particles which actually exist is approximated to obtain the super-particles with the multiplicities. Therefore, it is impossible to reproduce the distribution function of the real-particles (referred to as an original distribution function) in perfect using the super-particles. To reproduce the original distribution function, the original distribution function is reproduced using a histgram with a bin width of approximately $\epsilon$ with respect to a value of an arbitrary attribute. This $\epsilon$ is a quantity which corresponds to a width of a bin in the bin method. It is required to decrease the multiplicities of the super-particles and increase the total number of super-particles in order to decrease $\epsilon$.

When the multiplicities of the all super-particles become one, the super-particles are equivalent to the real-particles which actually exist. At this time, it becomes possible to truly exactly simulate natural phenomena using the super-particle method. In this case, $\epsilon$, which is a finite small value, is extremely close to zero. Since $\epsilon$ is finitely small, the total number of the real-particles is finitely large even when there are an exceedingly large number of real-particles.

Next, the entire space which is a space where the simulator 1 simulates will be described.

A space spanning several kilometers where the natural phenomena are to be observed or where the natural phenomena are desired to be predicted may be specified as the entire space. The entire space, which has lengths in the x, y, and z axis directions which specify a volume of the entire space, can be of an arbitrary size. The arbitrary size of the entire space is not limited to a range of several kilometers. For instance, the entire space may be a square with a several millimeters sides or span as much as several thousand kilometers. Moreover, the shape of the entire space is not limited to a rectangular parallelepiped, and may be in an arbitrary shape.

In addition, for convenience, it is assumed that the entire space is a virtual space whose end in the horizontal direction is connected to another virtual space in series. In other words, a real-particle which goes out from the entire space through its right side boundary enters the adjacent space through its left side boundary. A rule to define such a virtual space is usually referred to as a periodic boundary condition.

Moreover, the entire space is divided into spaces with an arbitrary size which is referred to as a divided space (also referred to as a space grid). The divided space also has lengths in the x, y, and z axis directions which specify a volume of the divided space. In the embodiment, the divided space is assumed to be a rectangular parallelepiped, and each vertex of the rectangular parallelepiped is assumed to be a grid point.

The super-water-droplet and the super-water-droplet-based model are not limited to be applied to the real-water-droplets, and may be enhanced to be applied to a super-particle and a super-particle-based model. Accordingly, the super-water-droplet and the super-water-droplet-based model can be applied to any kind of a real-particle such as a real-droplet and a real-particle with an arbitrary chemical composition, as long as the super-particles representing the real-particles collide and coalesce with one another. Then, the simulator 1 can simulate changes in the real-droplet or the real-particle with an arbitrary chemical composition over elapsed time.

Through the input 3, there are input, as initial variables, data relating to the super-water-droplet, data relating to the entire space, data relating to the calculation time, data relating to ambient conditions (ambient condition data), and data relating to storage areas.

The data relating to the super-water-droplet includes a group of attributes of each of the super-water-droplets (merely a radius R of the super-water-droplet and a mass of the cloud condensation nucleus in the simplest case) and a total number N of the super-water-droplets. In the embodiment, the group of attributes of the super-water-droplet merely includes the radius of the super-water-droplet and the mass of the cloud condensation nucleus in the super-water-droplet. Here, the group of attributes of the super-water-droplet does not include a velocity v of the super-water-droplet, a position $\vec{r}$ of the super-water-droplet, or a multiplicity n of the super-water-droplet.

More specifically, the data relating to the super-water-droplet include a radius R of the water-droplets included in each of the super-water-droplets, a velocity $\vec{v}$=(vx, vy, vz) of the water-droplets included in each of the super-water-droplets, a mass M of the cloud condensation nucleus in the water-droplets included in each of the super-water-droplets, a position of each of the super-water-droplets $\vec{r}$=(x, y, z), and a multiplicity n of each of the super-water-droplets. However, in the embodiment, it is not required to input all of the data relating to the super-water-droplet described above. Only the total number of the super-water-droplet needs to be input. Then, a calculator of microphysics model 7 set the rest of the data.

The data relating to the entire space include horizontal lengths[km] of the entire space (a width and a depth of the entire space), a vertical length[km] of the entire space (a height of the entire space), a horizontal intervals[m] of the space grid (a width and depth of the divided space), and a vertical interval[m] of the space grid (a height of the divided space). The data relating to the entire space described above are used for calculation. However, besides the data, there may be input numbers of grid units in the horizontal direction (numbers of the divided spaces in the horizontal direction) and the number of grid units in the vertical direction (the number of the divided spaces in the vertical direction).

The data relating to the calculation time include an initial time [sec] which is a time when the simulation starts, a time step (a time interval)[sec] at which changes over the time step is output, and a total calculation time [sec] (an arbitrary simulation time) for which the simulation is to be performed.

The data relating to the ambient conditions are variables which express a state of the entire space where the water-droplets exist, that is, a state of the atmosphere. More specifically, the data relating to the ambient conditions include a wind velocity $\vec{U}$=(U, V, W), a relative humidity S (S=1 expresses 100% in humidity), a density of moist air $\rho=\rho_d+\rho_v$ ($\rho_d$: a density of dry air, $\rho_v$: a density of water vapor), a mixing ratio of the water vapor $q_v=\rho_v/\rho$, a temperature T, a potential temperature $\theta$, $\Pi=(P/P_0)^{(R_d/c_p)}$ ($\Pi$: Exner function, $P_0$: a reference pressure 1000 [hPa], $R_d$: a gas constant of the dry air, $c_p$: a specific heat at a constant pressure), a mass $\rho_w$ of the water liquid per space unit volume, and a mass $\rho S_v$ of the water per space unit volume which evaporated per unit time. Here, the space unit volume is the volume of the divided space.

The data relating to the storage areas specify storage areas in the data storage 5 which store the data input through the input 3 and data in a progress of being calculated. The data relating to the storage area specify for instance, as arrays of the number N of data, a storage area which stores a terminal velocity of each super-water-droplet, a storage area which stores an x coordinate of each super-water-droplet, a storage area which stores a y coordinate of each super-water-droplet, a storage area which stores a z coordinate of each super-water-droplet, a storage area which stores the radius of each super-water-droplet, a storage area which stores the mass of the cloud condensation nucleus included in each super-water-droplet, and a storage area which stores the multiplicity of each super-water-droplet.

Moreover, the data relating to the storage area specify a storage area which stores an x element (an element in the x-axis direction) (U) of the wind velocity in a fluid dynamics model (that is, a general fluid dynamics model of the atmospheric fluid field), a storage area which stores a y element (an element in the y-axis direction) (V) of the wind velocity in the fluid dynamics model, a storage area which stores a z element (an element in the z-axis direction) (W) of the wind velocity in the fluid dynamics model, a storage area which stores a potential temperature θ in the fluid dynamics model, a storage area which stores the air density ρ in the fluid dynamics model, a storage area which stores the mixing ratio of vapor $q_v$ in the fluid dynamics model, a storage area which stores a pressure p in the fluid dynamics model, a storage area which stores a temperature T in the fluid dynamics model, and a storage area which stores a relative humidity S in the fluid dynamics model.

The data storage 5 stores and, as necessary, outputs the initial variables (various data) input through the input 3, and the data in the progress of being calculated by the calculator of microphysics model 7 and a calculator of fluid dynamics model 9. The data storage 5 includes a general memory, a hard disk, and so on.

The calculator of microphysics model 7 simulates the cloud microphysics process at every time step (time interval) using the previously specified super-water-droplet-based model as a cloud microphysics model based on the data relating to the super-water-droplet input as the initial variables through the input 3. The calculator of microphysics model 7 includes a calculator of motion of super-water-droplet (a calculation means of motion of super-water-droplet) 7a, a calculator of condensational growth of super-water-droplet (a calculation means of condensational growth of super-water-droplet) 7b, and a calculator of collision-coalescence of super-water-droplets (a calculation means of collision-coalescence of super-water-droplets) 7c. When the data relating to the super-water-droplet are input to the calculator of microphysics model 7, a multiplicity of each of the super-water-droplets is determined based on the super-water-droplet-based model. Then, a number which identifies each of the super-water-droplets is assigned.

The water-droplet, which is subject to the gravity and air resistance from the atmosphere, moves in accordance with the common equation of motion. The calculator of motion of super-water-droplet 7a calculates motion of the super-water-droplet assuming that the super-water-droplet similarly moves in accordance with the equation of motion. The equation of motion is given as EXPRESSION 1 shown below.

$$m\frac{d\vec{v}}{dt} = m\vec{g} + \vec{F}_D(\vec{v}, \vec{U}, R)$$

$$\frac{d}{dt}\vec{r} = \vec{v}$$

[EXPRESSION 1]

In the first equation shown in EXPRESSION 1, $\vec{g}$ ($g=(0,0,g)$) expresses the gravitational constant, $\vec{F}_D$ expresses the air resistance, and $\vec{U}$ expresses the wind velocity. Moreover, in the second equation shown in EXPRESSION 1, $\vec{r}$ expresses position coordinates of the water-droplet, and $\vec{v}$ expresses the velocity of the water-droplet. First of all, description is given to a case where EXPRESSION 1 is applied to the water-droplet. In fact, the radius of the water-droplet is extremely small. Therefore, a magnitude of the air resistance which the water-droplet receives from the atmosphere and the gravity cancel each other so as to be in balance. Thus, the water-droplet moves at a constant relative velocity with respect to the wind velocity. It is assumed that the water-droplet always moves at the relative velocity which is defined as the terminal velocity. In addition, the terminal velocity is assumed to be expressed by a function of the radius of the water-droplet as described in K. V. Beard, "Terminal Velocity and Shape of Cloud and Precipitation Drops Aloft", J. Atoms. Sci., 33, 851 (1976).

Figure 4:
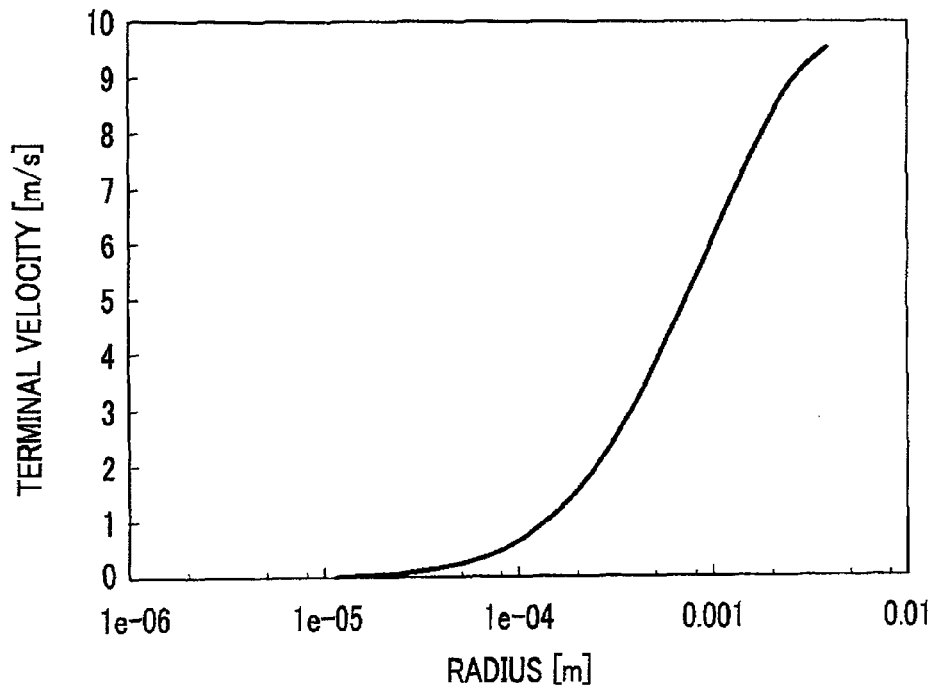
FIG. 4 is a diagram showing relationship between a radius and a terminal velocity of the real-water-droplet.

Subsequently, the radius R[m] of the water-droplet and the wind velocity $\vec{U}$ are given to determine the velocity of the water-droplet v[m/s]. FIG. 4 shows relationship between the radius and a velocity (to be exact, z element of the velocity while x and y elements of the terminal velocity are 0 [m/s]) of the water-droplet. FIG. 4 shows that the water-droplet with the radius of approximately 10 [μm] whose terminal velocity is nearly equal to 0 [m/s] rarely falls (not becomes a raindrop), that is, remains to be a cloud-droplet. Meanwhile, it is also understood that the water-droplet with the radius of approximately 1 [mm] whose terminal velocity is a little less than 10 [m/s] falls as a raindrop. To be exact, when an upward current velocity, that is, the z element W of the wind velocity $\vec{U}$ is smaller than the terminal velocity of the water-droplet, the water-droplet falls as a raindrop.

Similarly to the case of the water-droplet, the radius R[m] and the wind velocity $\vec{U}$ determine the velocity of the super-water-droplet. Moreover, similarly to the case of the water-droplet, the velocity $\vec{v}$ of the super-water-droplet determines the position coordinates of the super-water-droplet. By the way, m in EXPRESSION 1 expresses a mass of water contained in the water-droplet. The mass of the water is given by $(4\pi/3)R^3\rho_{liq}$ ($\rho_{liq}=1$ [g/cc] expresses a density of the water). Moreover, the mass m of the water contained in the water-droplet is sufficiently large compared with the mass M ($M=1.0\times10^{-16}$ [g]) of the cloud condensation nucleus in the water-droplet. Therefore, it is acceptable to disregard influence of the mass M of the cloud condensation nucleus on the motion of the water-droplet. Here, the terminal velocity is a velocity in the state where the gravity mg and the air resistance $F_d$ are in balance, that is, in the state where $-mg=F_d$.

Then, the velocity $\vec{v}$ of the super-water-droplet is given by $\vec{v}=\vec{U}-(0, 0, vt)$ where vt is the terminal velocity of the super-water-droplet, and the wind velocity $\vec{U}=(U, V, W)$. In other way, vx=U, vy=V, and vz=W−vt. FIG. 4 shows a graph of a function of R which expresses the terminal velocity vt of the super-water-droplet.

A volume of liquid water contained in the water-droplet (the radius of the water-droplet is focused to obtain the volume of liquid water, here) changes as the water-droplet absorbs and releases water vapor in the atmosphere in accordance with ambient humidity. Thus, the calculator of condensational growth of super-water-droplet 7b calculates a change in the volume of liquid water contained in the super-water-droplet (the radius of the super-water-droplet), which changes similarly to the volume of liquid water contained in the water-droplet. In other words, the condensational growth of the super-water-droplet is calculated. In general, the condensational growth of the water-droplet over elapsed time is given by EXPRESSION 2 shown below.

$$R\frac{dR}{dt} = \frac{(S-1) - \frac{a}{R} + \frac{b}{R^3}}{F_k + F_d}$$ [EXPRESSION 2]

In EXPRESSION 2, S is a relative humidity. $F_k$ is a term relating to thermal diffusion of the water-droplet and depends on the temperature. $F_d$ is a term relating to vapor diffusion of the water-droplet and also depends on the temperature. Moreover, a term of a expresses effects that the condensational growth decreases as a surface tension of the water-droplet increases, and the term of a also depends on the temperature. A term of b expresses effects that the condensational growth increases as solute effects of the cloud condensation nucleus (CCN) increases, and the term of b depends on the mass M of the cloud condensation nucleus. EXPRESSION 2 is described in R. R. Rogers & M. K. Yan, "A Short Course in Cloud Physics", Third Edition, Butter worth Heinemann.

Thus, the calculator of condensational growth of super-water-droplet 7b calculates the condensational growth of the super-water-droplet in accordance with EXPRESSION 2.

The calculator of collision-coalescence of super-water-droplets 7c calculates the groups of attributes, the multiplicities, and the total number of the super-water-droplets when the super-water-droplets collide and coalesce with one another (collision-coalescence). The calculator of collision-coalescence of super-water-droplets 7c calculates about the collision-coalescence of the super-water-droplets by using a numerical simulation according to the Monte Carlo method, which will be described later.

First of all, there will be described a probabilistic collision between the water-droplets (particles) which exist in a certain space. It is assumed that two water-droplets are flying in a space with a volume of ΔV. The two water-droplets are assumed to be water-droplets i=1 and 2, and have a velocity $\vec{v}_i$ and a radius $R_i$. In this case, an effective volume of a space where the two water-droplets sweep (a region where the two water-droplets may come into contact with or pass by each other) in a time interval Δt is given by EXPRESSION 3 shown below.

$$\pi(R_1+R_2)^2|\vec{v}_1-\vec{v}_2|\Delta t$$ [EXPRESSION 3]

Figure 5:
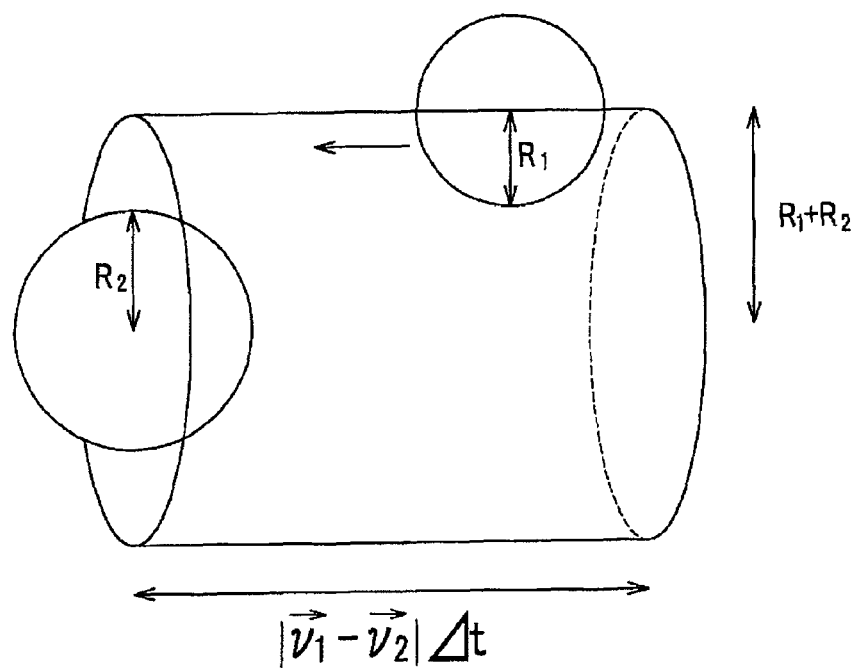
FIG. 5 is a diagram illustrating a volume of a space where the real-water-droplets sweeps each other at a certain time.

FIG. 5 schematically shows a state expressed by EXPRESSION 3. As shown in the FIG. 5, it is assumed that the two water-droplets are uniformly and randomly located in ΔV. In other words, probabilities that the water-droplet is located at any positions are assumed to be identical in ΔV. Then, the probability that the two water-droplets collides with one another in Δt is effectively equal to a probability that one of the two water-droplets is located within the volume of the space where the other of the two water-droplets sweeps, and given by EXPRESSION 4.

$$\pi(R_1+R_2)^2|\vec{v}_1-\vec{v}_2|\Delta t/\Delta V$$ [EXPRESSION 4]

Moreover, when there are a plurality of water-droplets in a space with a sufficiently small volume, it is assumed that the water-droplets collide with one another at the same probability with the above. However, when the volume of the water-droplet (or, the radius) is extremely small, it may be impossible to easily obtain the probability. The water-droplet is fundamentally minuscule, and remains minuscule without the condensational growth or the collision-coalescence. In this situation, an inertia force of the water-droplet is extremely small. Therefore, one water-droplet might go around another water-droplet with which the one water-droplet is about to collide and coalesce. On the other hand, one water-droplet might bounce against and not coalesce with another water-droplet even when the two water-droplets collide with one another.

In consideration of the above-described situation, a probability $P_{jk}$ of collision-coalescence between a water-droplet j and a water-droplet k is given by EXPRESSION 5 shown below.

$$P_{jk} = E_{jk}\frac{\Delta t}{\Delta V}\pi(R_j+R_k)^2|\vec{v}_j-\vec{v}_k|$$ [EXPRESSION 5]

In EXPRESSION 5, $E_{jk}$ is called as a collision efficiency, and is a function of $R_j$ and $R_k$ which are real numbers between [0, 1]. A precise collision efficiency $E_{jk}$ has been theoretically and experimentally acquired, and is assumed to be given as described in M. H. Davis, "Collisions of Small Cloud Droplets: Gas Kinetic Effects", J. Atoms. Sci., 29, 911 (1972), W. D. HALL, "A Detailed Microphysical Model Within a Two-Dimensional Dynamic Framework Model Description and Preliminary Results", 37, 2486 (1980), and P. R. Jonas, "THE COLLISION EFFICIENCY OF SMALL DROPS", QUART. J. ROY. METEOR. SOC. 98, 681 (1972).

The description above has been given to the probability that the water-droplets collide and coalesce with one another. Next, there will be described how the probability is applied to a probability that the super-water-droplets collide and coalesce with one another. First of all, one or more new super-water-droplets are formed when the super-water-droplets collide and coalesce with one another in accordance with the multiplicities as described above. The probability that the super-water-droplets collide and coalesce with one another in this case is calculated as described below.

First of all, it is assumed that the number $n_j$ of real-water-droplets which have an identical group of attributes collide with the number $n_k$ of real-water-droplets which have an identical group of attributes. Then, the number $n_j n_k$ of pairs (combinations) are made in total. Accordingly, each pair of the real-water-droplets collide and coalesce with one another by the probability $P_{jk}$ of collision-coalescence given by EXPRESSION 5. In this case, an expectation value of a total number of collision-coalescences between the real-water-droplets is $n_j n_k P_{jk}$.

It is assumed that a super-water-droplet with a multiplicity of $n_j$ and a super-water-droplet with a multiplicity of $n_k$ collide and coalesce with one another. Then, the two super-water-droplets collide and coalesce with one another to form a super-water-droplet with a multiplicity of $|n_k-n_j|$ and a super-water-droplet with a multiplicity of $\min(n_k, n_j)$. This means that $\min(n_k, n_j)$ pairs of the real-water-droplets collide and coalesce. Therefore, $P_{jk}^{(s)}$ which expresses the probability of collision-coalescence between the super-water-droplets is given by EXPRESSION 6 below. When $n_k=n_j$, super-water-droplets with multiplicities of "[$n_j/2$]" and $n_j$-"[$n_j/2$]" are formed. The number of collision-coalescences between the real-water-droplets is also $\min(n_k, n_j)$. Therefore, EXPRESSION 6 is also used in a case where $n_k=n_j$.

$$P_{jk}^{(s)}=\max(n_k,n_j)P_{jk} \quad \text{[EXPRESSION 6]}$$

Thus, EXPRESSION 7 below shows that an expectation value of a total number of collision-coalescences between the real-water-droplets is also expressed by the probability $P_{jk}^{(s)}$ of collision-coalescence between the super-water-droplets.

$$\min(n_k,n_j)P_{jk}^{(s)}=n_k n_j P_{jk} \quad \text{[EXPRESSION 7]}$$

The probability $P_{jk}^{(s)}$ of collision-coalescence between the super-water-droplets has been acquired. Subsequently, based on the probability $P_{jk}^{(s)}$, the calculator of collision-coalescence of super-water-droplets 7c numerically simulates the collision-coalescence process of the super-water-droplet using the Monte Carlo method. In other words, a random number is generated, and super-water-droplets in an identical divided space are made to collide and coalesce with one another depending on the random number.

There will be described how the calculator of collision-coalescence of super-water-droplets 7c calculates about a collision-coalescence at a time t.

First of all, the calculator of collision-coalescence of super-water-droplets 7c examines the positions of the super-water-droplets at a time t in order to group the super-water-droplets into the divided spaces in advance. It is assumed that the number N of the super-water-droplets are located in a certain divided space, and the super-water-droplets $1=1, 2, \ldots, N$ respectively have multiplicities of $n_1$ ($n_1$ is an arbitrary positive integer).

The calculator of collision-coalescence of super-water-droplets 7c selects a pair (j and k) from all of the super-water-droplets using random numbers. This pair is a candidate pair of collision-coalescence which are to collide and coalesce with one another. When an odd number of the super-water-droplets exist in the divided space, one of the super-water-droplets is included in none of the candidate pairs of collision-coalescence. In this case, the greatest integer which does not exceed N/2, that is, "[N/2]" pairs are determined.

Next, how to make the candidate pairs of collision-coalescence is described in more detail. First of all, a permutation of numbers $S=(1, 2, \ldots, N)$ is randomly permuted into $S'=(a_1, a_2, \ldots, a_N)$ where $a_k=1, 2, \ldots, N$. None of the numbers included in the permuted permutation $S'$ overlaps with another. In other words, if $k \ne k'$, then $a_k \ne a_{k'}$. Accordingly, there are N! kinds of possible permutations $S'$. Thus, to randomly permute the permutation S including N elements into a permutation $S'$ is defined as to select anyone of the N! kinds of permutations $S'$ by an identical probability $1/N!$.

Here, the calculator of collision-coalescence of super-water-droplets 7c can perform this operation at a computational cost proportional to the number N in the numerical computation even when the number N of the super-water-droplets increases. After that, the calculator of collision-coalescence of super-water-droplets 7c makes the candidate pairs of collision-coalescence in an order of the numbers included in the permuted permutation $S'$. More specifically, the candidate pairs of collision-coalescence are determined in an order of $(a_1, a_2), (a_3, a_4), (a_5, a_6), \ldots$.

By the way, all combinations of pairs of the super-water-droplets in the divided space are possible to collide with one another. Therefore, it is required to determine a probability of collision-coalescence between each of the all possible combinations of $N(N-1)/2$ pairs of the super-water-droplets. However, such a large number of combinations of pairs require too much calculation time and result in inefficiency. Accordingly, in the calculator of collision-coalescence of super-water-droplets 7c, a set of the "[N/2]" pairs represent a set of all possible non-overlapped pairs of the super-water-droplets which are to collide and coalesce with one another.

Thus, the calculator of collision-coalescence of super-water-droplets 7c reduces the calculation time in simulating the collision-coalescence process of the super-water-droplets. As a result, the computational cost per unit time is proportional not to $N^2$ but to N.

The calculator of collision-coalescence of super-water-droplets 7c increases the probability of collision-coalescence $P_{jk}^{(s)}$ to compensate the decreased number of pair combinations. Therefore, it is assured to reproduce the expectation value of total number of collisions in the divided space.

More specifically, in the calculator of collision-coalescence of super-water-droplets 7c, a probability of collision-coalescence $p_i$ between an i-th pair (j, k) of the super-water-droplets is assumed to be $$p_i := \frac{N(N-1)}{2[N/2]} P_{jk}^{(s)} = \frac{N(N-1)}{2[N/2]} \max(n_j, n_k) P_{jk}.$$

Then, the expectation value of the total number of collision-coalescences in the divided space is reproduced by EXPRESSION 8 shown below.

$$\sum_{i=1}^{[N_s/2]} \min(n_{ji}, n_{ki}) p_i \cong \sum_{j=1}^{N_s} \sum_{k=1}^{N_s} \frac{1}{2} \min(n_i, n_k) P_{jk}^{(s)} \quad \text{[EXPRESSION 8]}$$

Thus, the calculator of collision-coalescence of super-water-droplets 7c performs calculations described below for all the candidate pairs of collision-coalescence $i=1, 2, \ldots,$ "[N/2]". Assuming that the random number is Ran(0, 1), and the pair (j, k) of the super-water-droplets collide with one another for q times from a time t to a time $t+\Delta t$, the number of collision-coalescences q is calculated by EXPRESSION 9 below.

$$q = \begin{cases} [p_i]+1 & \text{if } Ran < p_i - [p_i] \\ [p_i] & \text{if } Ran \ge p_i - [p_i] \end{cases} \quad \text{[EXPRESSION 9]}$$

In EXPRESSION 9, q is supposed to be either of zero (no collision-coalescence occurs) or one (a collision-coalescence occurs). However, for efficient numerical calculation, a case where the super-water-droplets collide with one another for plural times is also taken into consideration. If $q=0$, no calculation is performed for the i-th pair of super-water-droplets. Meanwhile, if $q \ne 0$, calculation shown in EXPRESSION 10 below is performed for the i-th pair of super-water-droplets. EXPRESSION 10 represents the Monte Carlo method for the super-water-droplets.

1. if $n_j > n_k$ $$m := \min(q, \lfloor n_j/n_k \rfloor)$$

i. if $n_j - mn_k > 0$ $R'_j = R_j, M'_j = M_j, \vec{r}'_j = \vec{r}_j, n'_j = n_j - mn_k,$ $R'_k = (mR_j^3 + R_k^3)^{1/3}, M'_k = (mM_j + M_k),$ $\vec{r}'_k = \vec{r}_k, n'_k = n_k$ ii. if $n_j - mn_k = 0$ $n'_j = \lfloor n_k/2 \rfloor, n'_k = n_k - \lfloor n_k/2 \rfloor,$ $R'_j = R'_k = (mR_j^3 + R_k^3)^{1/3},$ $M'_j = M'_k = (mM_j + M_k),$ $\vec{r}'_j = \vec{r}_j, \vec{r}'_k = \vec{r}_k$  [EXPRESSION 10]

In EXPRESSION 10, when the multiplicity $n_j \leq$ the multiplicity $n_k$, j is swapped by k in an operation of i-th pair.

Moreover, in EXPRESSION 10, a symbol with "'" expresses a value updated after a collision-coalescence. Thus, the calculator of collision-coalescence of super-water-droplets 7c processes operations expressed by EXPRESSION 8 and EXPRESSION 9 for all the divided spaces. Here, the super-water-droplet whose multiplicity becomes zero is removed. After that, calculation about all the collision-coalescences at the time t is completed so that a state at the time t+Δt is obtained.

As described above, the calculator of collision-coalescence of super-water-droplets 7c calculates about the collision-coalescence between the super-water-droplets.

The calculator of fluid dynamics model 9 performs calculation using the fluid dynamics model (nonhydrostatic model) which models the fluid dynamics processes of a cloud based on the ambient condition data input through the input 3 and the results calculated by the calculator of microphysics model 7. Then, the calculator of fluid dynamics model 9 feeds back the calculated results to the calculator of microphysics model 7.

The calculator of fluid dynamics model 9 calculates the fluid dynamics processes of the cloud using EXPRESSIONS 11-15 below.

$$\rho \frac{D\vec{v}}{Dt} = -\nabla P - (\rho + \rho_w)\vec{g} + \lambda \nabla^2 \vec{v}$$  [EXPRESSION 11]

$$P = \rho R_d T$$  [EXPRESSION 12]

$$\frac{D\theta}{Dt} = -\frac{L}{c_p \Pi} S_v + k \nabla^2 \theta$$  [EXPRESSION 13]

$$\frac{D\rho}{Dt} = -\rho \nabla \cdot \vec{v}$$  [EXPRESSION 14]

$$\frac{Dq_v}{Dt} = S_v$$  [EXPRESSION 15]

In EXPRESSIONS 11-15, $D/Dt = \partial/\partial t + \vec{v} \cdot \nabla$ is Lagrange differential operation, $\rho = \rho_d + \rho_v$ is the density of moist air, $q_v = \rho_v/\rho$ is the mixing ratio of vapor, $\vec{v}$ is the velocity of the wind, T is the temperature, $\theta$ is a potential temperature, $\Pi = (P/P_0)^{(R_d/c_p)}$ is Exner function, $P_0$ is the reference pressure 1000 [Pa], $\rho_w$ is the mass of liquid water per unit space volume, $\rho S_v$ is the mass of vapor which becomes liquid water per unit time, $\vec{g}$ is the gravitational constant, $\lambda$ and $\kappa$ are transport coefficients by turbulence, $R_d$ is a gas constant of the dry air, $c_p$ is a specific heat at a constant pressure, and L is a latent heat of vapor.

$\rho_w$ and $S_v$ are determined in accordance with the cloud microphysics process which is calculated by the calculator of microphysics model 7. A term of $\rho_w \vec{g}$ in EXPRESSION 11 expresses an effect that the air is dragged by the water-droplet.

Moreover, a term of $S_v L/c_p \Pi$ in EXPRESSION 13 expresses an effect that when the water vapor becomes liquid water, the latent heat is released to warm the atmosphere. In addition, a term of $S_v$ in EXPRESSION 15 expresses that when the water vapor is condensed to be liquid water, or the water-droplet evaporates, an amount of the water vapor in the atmospheric increases or decreases.

Subsequently, the calculator of fluid dynamics model 9 feeds back the calculation results to the calculator of microphysics model 7. Next, there will be described information which is sent from the calculator of fluid dynamics model 9 to the calculator of microphysics model 7 and from the calculator of microphysics model 7 to the calculator of fluid dynamics model 9.

Information on the wind velocity, the atmospheric pressure, the temperature, and the humidity is sent from the calculator of fluid dynamics model 9 to the calculator of microphysics model 7. In the calculator of microphysics model 7, the information is used for calculation using the super-water-droplet-based model. The reason is that the motion and the condensational growth of the super-water-droplet depend on (are influenced by) the wind velocity, the atmospheric pressure, the temperature, and the humidity at the position of the super-water-droplet.

On the other hand, $\rho_w$ and $S_v$ are sent from the calculator of microphysics model 7 to the calculator of fluid dynamics model 9. In other words, the super-water-droplet-based model influences the fluid dynamics model through the terms of $\rho_w$ and $S_v$. To be concrete, the super-water-droplets are grouped into the divided spaces. Then, a sum over all super-water-droplets in each of the divided spaces is calculated to obtain the amounts of $\rho_w$ and $S_v$. In other words, $\rho_w$ and $S_v$ in a certain divided space is calculated by EXPRESSION 16 and EXPRESSION 17 shown below.

$$\rho_w = \sum_i \frac{m_i}{\Delta V}$$  [EXPRESSION 16]

$$\rho S_v = \sum_i \left(-\frac{dm_i}{dt}\right) \frac{1}{\Delta V}$$  [EXPRESSION 17]

In EXPRESSIONS 16 and 17, $\Delta V$ expresses a volume of the divided space. The sums are calculated over the all super-water-droplets in the divided space. Moreover, $m_i := n_i (4\pi/3) R_i^3 \rho_{liq}$ is a mass of water expressed by each super-water-droplet. Here, $\rho_{liq} = 1$ [g/cc] expresses the density of water.

The output 11 outputs the results calculated by the calculator of microphysics model 7 and the calculator of fluid dynamics model 9 based on the data relating to the calculation time such as the time step (time interval), the total calculation time, and so on input through the input 3.

According to the simulator 1, a plurality of real-water-droplets which have an identical group of attributes in the divided space is processed as a super-water-droplet. Thus, the super-water-droplet-based model is used as the cloud microphysics model in the calculator of microphysics model 7. Therefore, the real-water-droplet is not expressed using a distribution function. Accordingly, even when the number of attributes of the real-water-droplet increases, it is possible to prevent an increase in the time to calculate about the cloud formation, the rainfall, and so on. As a result, it is possible to predict the cloud formation, the rainfall, and so on with high accuracy.

Moreover, according to the simulator 1, the calculator of motion of super-water-droplet 7a, the calculator of condensational growth of super-water-droplet 7b, and the calculator of collision-coalescence of super-water-droplets 7c of the calculator of microphysics model 7 respectively calculate about the collision-coalescence, the condensational growth, and the motion of the super-water-droplet. As a result, it is possible to predict how the real-water-droplets change over elapsed time with higher accuracy.

In addition, according to the simulator 1, the calculator of collision-coalescence of super-water-droplets 7c calculates about the collision-coalescence of the super-water-droplets using the Monte Carlo method. As a result, it is possible to greatly reduce the calculation time.

(Operation of Simulator)

Figure 6:
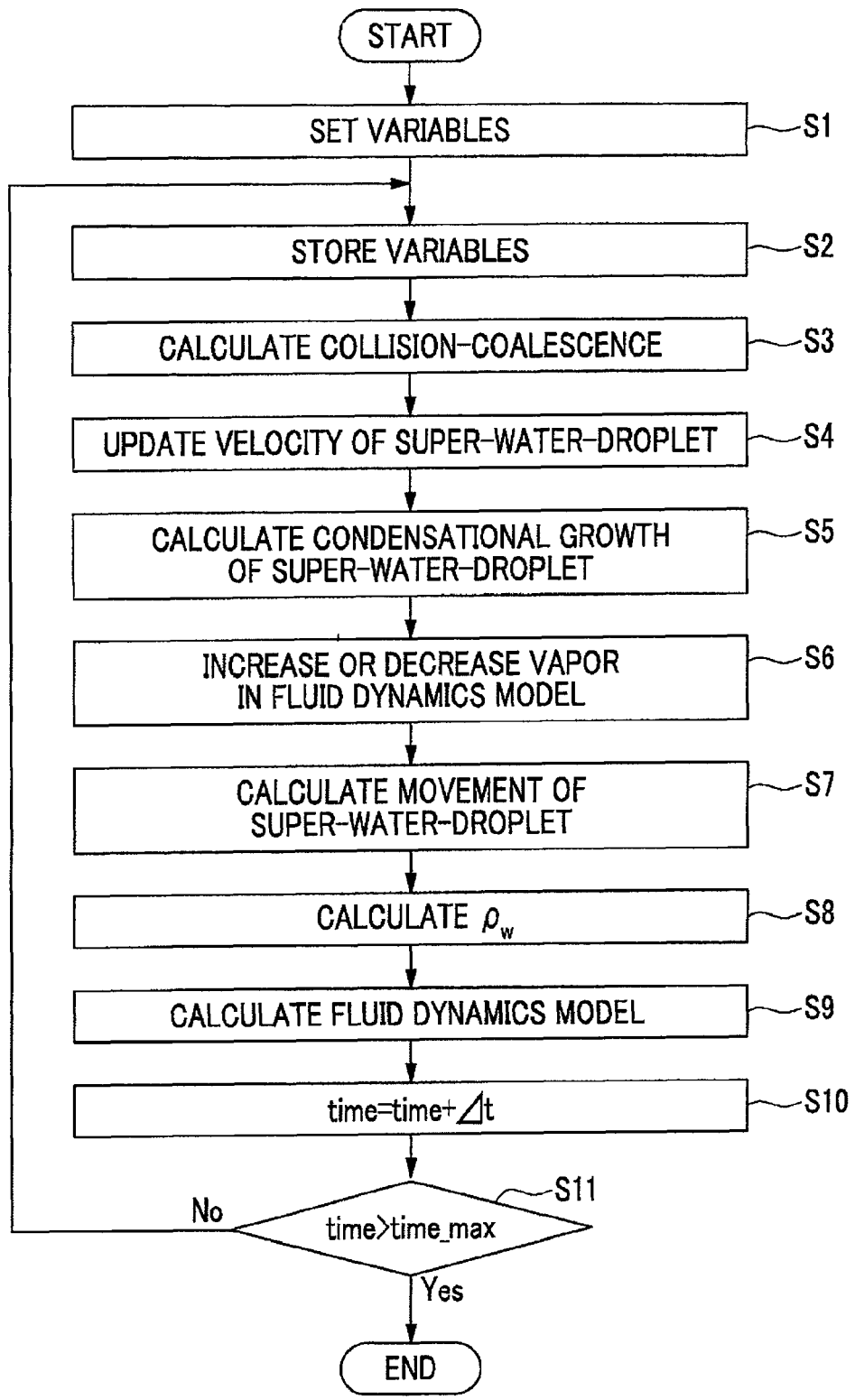
FIG. 6 is a flowchart showing general operations by the simulator shown in FIG. 1.

Next, operations of the simulator 1 will be described referring to a flowchart shown in FIG. 6 (See FIG. 1, as needed).

First of all, in the simulator 1, the initial variables are input through the input 3. Then, various variables necessary for the operation of the simulator 1 are set (Step S1). After that, the simulator 1 stores the initial variables input through the input 3 into the data storage 5 (Step S2).

Subsequently, in the simulator 1, the calculator of collision-coalescence of super-water-droplets 7c of the calculator of microphysics model 7 calculates about the collision-coalescence of the super-water-droplet (Step S3). Moreover, in the simulator 1, the calculator of motion of super-water-droplet 7a of the calculator of microphysics model 7 calculates and updates the velocity of the super-water-droplet (Step S4). In addition, in the simulator 1, the calculator of condensational growth of super-water-droplet 7b of the calculator of microphysics model 7 calculates about the condensational growth of the super-water-droplet (Step S5).

Then, in the simulator 1, the calculator of fluid dynamics model 9 performs calculation using the fluid dynamics model to increase or decrease the vapor (Step S6). After that, the simulator 1 feeds back the result of increasing or decreasing the vapor to the calculator of microphysics model 7.

Next, in the simulator 1, the calculator of motion of super-water-droplet 7a of the calculator of microphysics model 7 calculates the movement distance of the super-water-droplet (Step S7). Moreover, in the simulator 1, the calculator of condensational growth of super-water-droplet 7b of the calculator of microphysics model 7 calculates the mass $\rho_w$ of the liquid water per unit volume of the divided space (Step S8). Then, the simulator 1 feeds back the result of calculating the mass $\rho_w$ of the liquid water per unit volume of the divided space to the calculator of fluid dynamics model 9.

After that, in the simulator 1, the calculator of fluid dynamics model 9 calculates a new fluid dynamics model based on the fed back result (Step S9). Then, the simulator 1 adds the time step $\Delta t$ to a current time t ("time" on the right side), to obtain an elapsed time ("time" on the left side) (Step S10). And, the simulator 1 examines whether the elapsed time has reached the total calculation time (time_max) (Step S11).

When the simulator 1 determines that the elapsed time has not reached the total calculation time (time_max) ("No" in Step S11), the operation returns to Step S2 to continue. On the other hand, when the simulator 1 determines that the elapsed time has reached the total calculation time ("Yes" in Step S11), the operation ends.

(Concrete Calculation Examples and Simulation Results by Simulator)

Next, there will be described a concrete calculation example and simulation results by the simulator 1.

First of all, the initial variables input to the simulator 1 are set as follows: the initial time time=0 [sec], the time step $\Delta t$=0.2 [sec], the total calculation time max_time=5400.0 [sec], the height of the divided space $\Delta z$=40 [m], the width of the divided space $\Delta x$=50 [m], the height of the entire space max_z=10 [km], the width of the entire space max_x=12 [km], the number of divided spaces in the vertical direction iz_max=max_z/$\Delta z$=250 [pieces], the number of divided spaces in the horizontal direction ix_max=max_x/$\Delta x$=240 [pieces], and the total number of the super-water-droplets N=2.4×10$^7$ [pieces].

Moreover, the wind velocity, the atmospheric pressure, the temperature, the humidity, and so on (the potential temperature $\theta$, the air density $\rho$, the mixing ratio of vapor $q_v$, the pressure P, the temperature T, and the relative humidity S) (together referred to as fluid variables, hereafter) are set for each of the all divided spaces as initial variables. These initial variables are set based on actually observed values.

Here, it is assumed that structures of the entire space and the divided spaces are uniform in the depth direction. In other words, it is assumed that states are uniform in the depth direction in the entire space and the divided spaces. Therefore, spaces without the depth (plane areas) are simulated to simplify the simulation and reduce the computation time.

Thus, the wind velocity, the atmospheric pressure, the temperature, and the humidity are set for each of the divided spaces. In addition, in the simulator 1, an initial condition that there is unstable and moist air is given to some (at 5 km or lower in altitude, for instance) of the divided spaces in the entire space. Moreover, a temperature in some (several hundred meters square, for instance) of the divided spaces to which the initial condition is given is increased by one degree with respect to the ambient air to promote instability of the divided space.

After that, the simulator 1 initializes all the variables for the super-water-droplets. Then, the simulator 1 arranges the super-water-droplets at random all over the entire space by setting, for each of the super-water-droplets iN, a coordinate value (referred to as an x coordinate PTL_XX(iN) of the super-water-droplet, hereafter) in a storage area PTL_XX (iN) where the x coordinate of the super-water-droplet is stored, as well as, a coordinate value (referred to as a z coordinate PTL_ZZ(iN) of the super-water-droplet, hereafter) in a storage area PTL_ZZ(iN) where the z coordinate of the super-water-droplet is stored. Here, iN=1, 2, . . . , N.

Moreover, it is assumed that 1.0×10$^8$ [pieces/m$^3$] of the cloud condensation nuclei are flying in the actual atmosphere (the entire space). (To be exact, a great number of cloud condensation nuclei are flying in the atmosphere. Therefore, water vapor is condensed on each of the cloud condensation nuclei to form a water-droplet. Here, each of the cloud condensation nuclei represents a water-droplet with a radius of nearly equal to zero). Then, the simulator 1 stores, as an initial value of the multiplicity of each of the super-water-droplets, an identical value of 1.0×10$^8$ [pieces/m$^3$]×10 [km]×12 [km]/ N=1.2×10$^{16}$/2.4×10$^7$=5.0×10$^8$ [pieces] in a storage area PTL_NN(iN) in the data storage 5. PTL_NN(iN) is a storage area where the multiplicity of each of the super-water-droplets is stored. Here, considering that the super-water-droplets with arbitrary multiplicities are reproduced by the distribution function of the real-water-droplets expressed using a histgram with a bin width of approximately ϵ with respect to a value of an arbitrary attribute, it is required to examine whether the total number and the multiplicities of the super-water-droplets are appropriate, based on the simulation results. However, the following description will be given under the assumption that the total number and multiplicities of the super-water-droplets are appropriate (with sufficient accuracy).

In addition, the simulator 1 assumes that the mass of the cloud condensation nucleus included in each of the super-water-droplets is of a uniformly random value in a range of $0$-$1.0 \times 10^{-16}$ [g]. Therefore, the simulator 1 stores $1.0 \times 10^{-16} \times$ RANDOM[g] to the storage area PTL_CCN (an abbreviation of Cloud Condensation Nuclei) (iN) (referred to as a cloud condensation nucleus of the super-water-droplet PTL_CCN (iN), hereafter) where the mass of cloud condensation nucleus of each of the super-water-droplets is stored in the data storage. RANDOM is a uniformly random number in a range of [0, 1].

Thus, when the mass of the cloud condensation nucleus of each of the super-water-droplets and ambient humidity are determined, the amount of the water vapor condensed on the cloud condensation nucleus is determined. Accordingly, in the simulator 1, the radius of the super-water-droplet is determined. In other words, the radius PTL_RR(iN) of the super-water-droplet is determined based on the mass PTL_CCN (iN) of the cloud condensation nucleus of the super-water-droplet and the humidity FLD_S(ix, iz) in a divided space including the position of the x coordinate PTL_XX(iN) and the z coordinate PTL_ZZ(iN) of the super-water-droplet.

In the initial state, the humidity reaches saturation in none of the divided spaces. Therefore, the amount of the vapor condensed on the cloud condensation nucleus is extremely small. Consequently, the radius of the water-droplet is as extremely small as approximately $10^{-8}$ [m], indicating that the water-droplet is invisible (in other words, the atmosphere looks transparent). Moreover, since the radius of each of the super-water-droplets is determined, the terminal velocity is also determined. Here, the terminal velocity of the super-water-droplet is defined as PTL_VZ(iN). The terminal velocity of the super-water-droplet PTL_VZ(iN) is nearly equal to 0 [m/s] indicating that the super-water-droplet is merely floating and drifted by the wind and does not fall.

Then, the simulator 1 stores the results of calculating about all the super-water-droplets at the current time t and the results of calculating the fluid dynamics model at the current time t in the data storage 5.

After that, the simulator 1 examines what kinds of super-water-droplets exist in each of the divided spaces. There are (ix_max)×(iz_max) divided spaces in total. For instance, it is assumed that the super-water-droplets are examined to specify that there are super-water-droplets in=3, 8, 100, 511, 1234 in the divided space of ix=2 and iz=3.

Next, the simulator 1 performs the following operations for all the divided spaces (ix, iz) where ix=1, . . . , ix_max, and iz=1, . . . , iz_max.

First of all, the simulator 1 assumes that there are $N_s$ super-water-droplets in the divided space to be calculated, and randomly generates "[$N_s$/2]" pairs of super-water-droplets. For instance, since there are $N_s$=5 super-water-droplets (in=3, 8, 100, 511, 1234) in the divided space (ix, iz)=(2, 3), "[$N_s$/2]"=2. Thus, the randomly generated two pairs are assumed to be (3, 100) and (8, 1234). More specifically, a permutation of numbers (3, 8, 100, 511, 1234) is randomly permutated into another permutation of numbers (3, 100, 8, 1234, 511), for instance. Then, two numbers are selected in an order of the numbers in the randomly permutated permutation (3, 100, 8, 1234, 511) to make each of the pairs (3, 100) and (8, 1234).

After that, a probability that each of the pair of super-water-droplets collide with one another is determined based on the radii of the pair of super-water-droplets. Here, $p_i$ expresses the collision probability between an i-th pair of super-water-droplets. Then, in the simulator 1, the calculator of collision-coalescence of super-water-droplets 7c of the calculator of microphysics model 7 generates a random number RANDOM in a range of [0, 1]. Thus, it is assumed that in case of RANDOM<$p_i$, the i-th pair of super-water-droplets collide with one another, while in case of RANDOM≧$p_i$, the i-th pair of super-water-droplets do not collide with one another.

By the way, when the time step Δt is not sufficiently small, the collision probability $p_i$ may be larger than one. In theory, the collision probability $p_i$, which is a probability, should never exceed one. However, it is expected that even the collision probability $p_i$ greater than one little influences the simulation result (since the collision probability $p_i$ scarcely exceeds one when the time step Δt is fairly small). In view of the above, in consideration of a case of $p_i$>1, the simulator 1 generates a random number RANDOM in the range of [0, 1] every time to determine whether the collision-coalescence occurs, and assumes that in a case of RANDOM<$p_i$−"[$p_i$]", the i-th pair of super-water-droplets collide with one another for "[$p_i$]"+1 times. On the other hand, it is assumed that in a case of RANDOM≧$p_i$−"[$p_i$]", the i-th pair of super-water-droplets collide with one another for "[$p_i$]" times. In other words, it is understood that in a case of $p_i$<1, that is, "[$p_i$]"=0, the collision-coalescence between the i-th pair of super-water-droplets occurs by the probability $p_i$.

For instance, it is assumed that the collision probability of the first pair (3, 100) in the divided space (ix, iz)=(2, 3) is 0.4 (the pair of super-water-droplets collide with one another by the probability of 40%). Then, when RANDOM is smaller than 0.4, the super-water-droplet [3] and the super-water-droplet [100] collide with one another so that the groups of attributes of the super-water-droplets are updated after the collision. On the contrary, when RANDOM is 0.4 or greater, the super-water-droplet [3] and the super-water-droplet [100] do not collide with one another. For instance, assuming that the collision probability is 1.3 (the pair of super-water-droplets collide with one another by the probability of 130%), $p_i$−"[$p_i$]"=1−"[1.3]"=1.3−1=0.3. In this case, when RANDOM is smaller than 0.3, the pair of super-water-droplets collide with one another for 1+1=2 times. When RANDOM is 0.3 or greater, the pair of super-water-droplets collide with one another only once.

Moreover, the terminal velocity of the super-water-droplet is determined in accordance with the radius of the super-water-droplet. Therefore, in the simulator 1, the calculator of motion of super-water-droplet 7a of the calculator of microphysics model 7 calculates the terminal velocity PTL_VZ (iN) of the super-water-droplet using the radius PTL_RR(iN) of the super-water-droplet at the time t. The calculated terminal velocity PTL_VZ(iN) is the terminal velocity at the time=time+Δt.

Moreover, the water vapor is condensed on or evaporated from the super-water-droplet in accordance with the humidity and the temperature of the ambient atmosphere around the super-water-droplet so as to change the radius of the super-water-droplet. Therefore, in the simulator 1, the calculator of condensational growth of super-water-droplet 7b of the calculator of microphysics model 7 calculates the condensational growth of the super-water-droplet. Here, the radius PTL_RR(iN) of the super-water-droplet is updated from the state at the time time to the state at the time time+Δt.

In the simulator 1, the calculator of condensational growth of super-water-droplet 7b of the calculator of microphysics model 7 calculates how much water vapor the super-water-droplet absorbs or releases. Accordingly, the volume of vapor in the divided space (ix, iz) is increased or decreased. In other words, the simulator 1 increases or decreases the value of the mixing ratio of vapor FLD_QV(ix, iz) in the fluid dynamics model in the calculator of fluid dynamics model 9.

The super-water-droplet moves under the influence of the wind velocity. The velocity of the super-water-droplet is determined by the difference between the ambient wind velocity and the terminal velocity of the super-water-droplet. Therefore, the simulator 1 updates values of the x coordinate PTL_XX(iN) and the z coordinate PTL_ZZ(iN) of the super-water-droplet to values at the time time+Δt based on the terminal velocity PTL_VZ(iN) of the super-water-droplet and the x element FLD_UU(ix, iz) and the z element FLD_WW(ix, iz) of the wind velocity in the fluid dynamics model.

In addition, the simulator 1 obtains the mass $\rho_w$ of the liquid water per unit space volume. To obtain the mass $\rho_w$ of the liquid water per unit space volume, the masses of the super-water-droplets in each divided space are summed. For instance, assuming that there are super-water-droplets iN=1, 3, 10, and 11 in a divided space, the mass $\rho_w$ of the liquid water per unit space volume is obtained using $\rho_w = \Sigma a \times$ PTL_NN(iN)×4π/3 {PTL_RR(iN)}$^3$ (iN=1, 3, 10, 11, a is a specific gravity of water).

Next, in the simulator 1, the calculator of fluid dynamics model 9 updates the fluid variables. The fluid variables change over elapsed time in accordance with general nonhydrostatic equations. Variables FLD_ARBITRARY(ix, iz) in the fluid dynamics model in all divided spaces are updated to the state at the time time+Δt in accordance with the nonhydrostatic equations. Thus, the simulator 1 repeats performing these operations until the total calculation time elapses.

(Operation Result by Simulator)

Next, the operation results (simulation results) by the simulator 1 will be described referring to FIGS. 7-15 (see FIG. 1, as needed).

FIGS. 7-15 show a state of cloud formation at each time having an abscissa axis of a width[m] of the entire space and an ordinate axis of a height[m] of the entire space.

Figure 7:
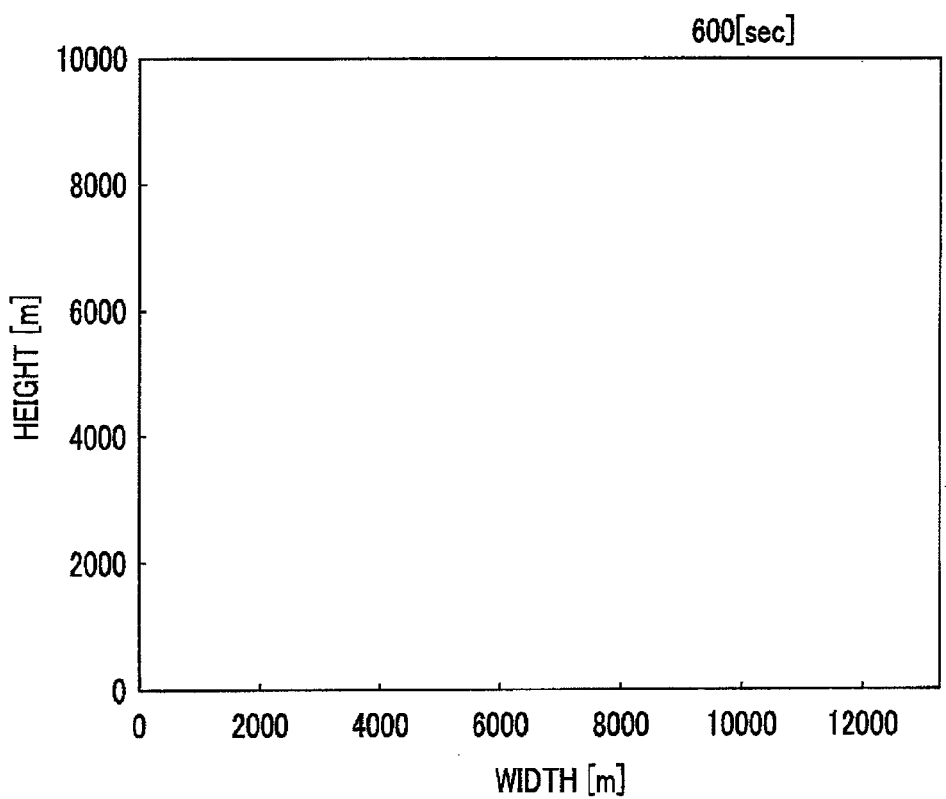
FIG. 7 is a diagram showing operation results according to the simulator.
Figure 8:
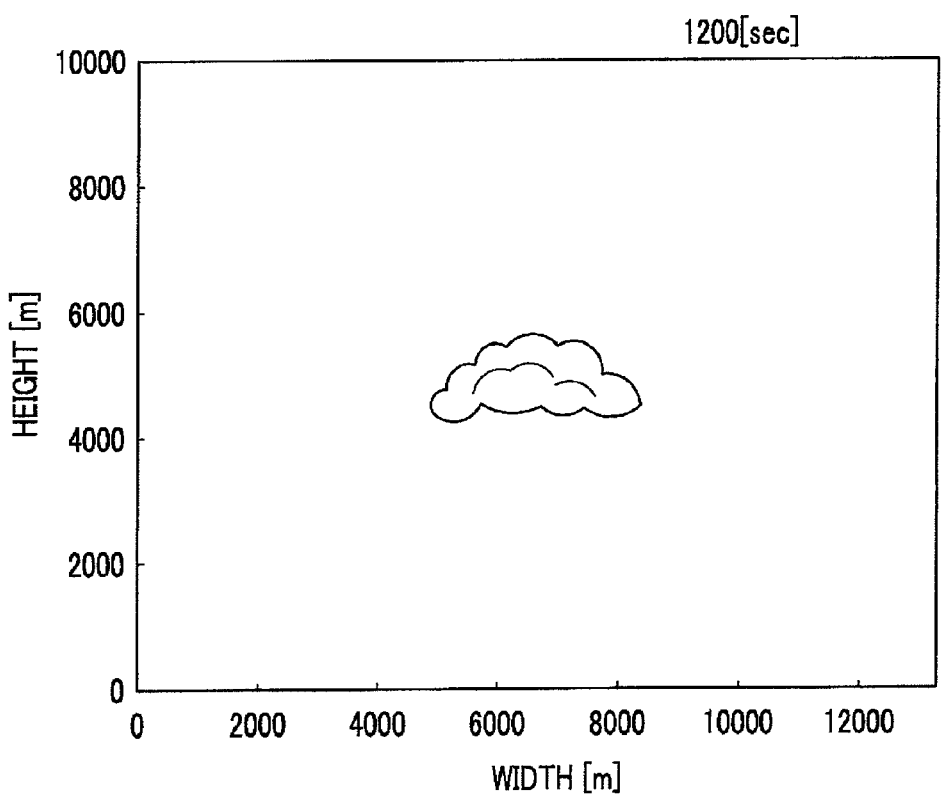
FIG. 8 is a diagram showing operation results according to the simulator.
Figure 9:
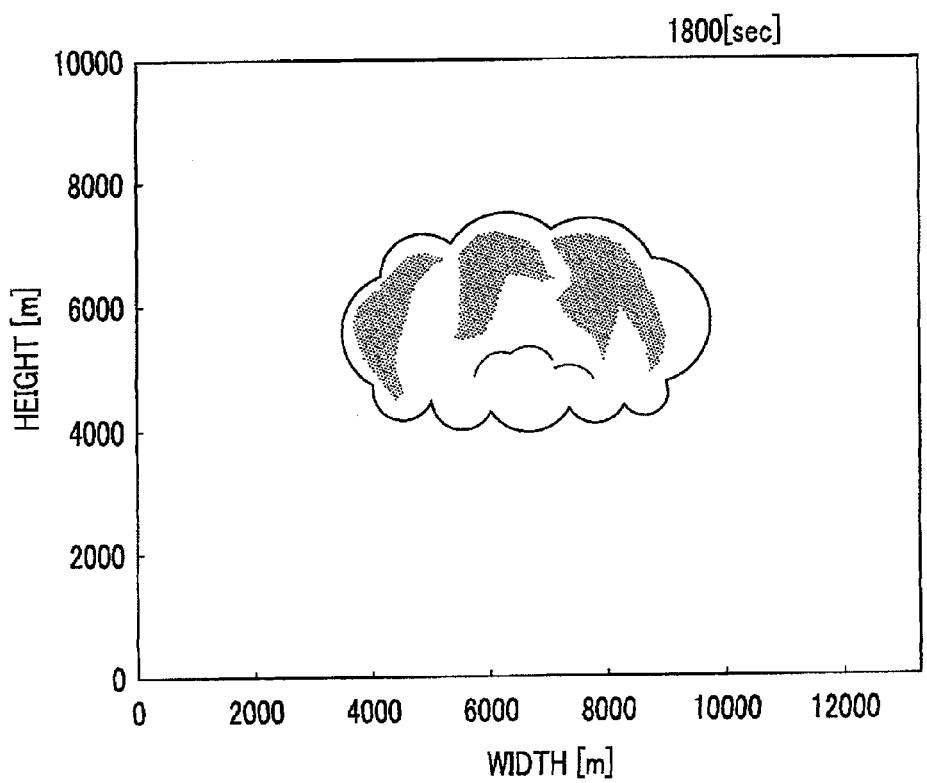
FIG. 9 is a diagram showing operation results according to the simulator.
Figure 10:
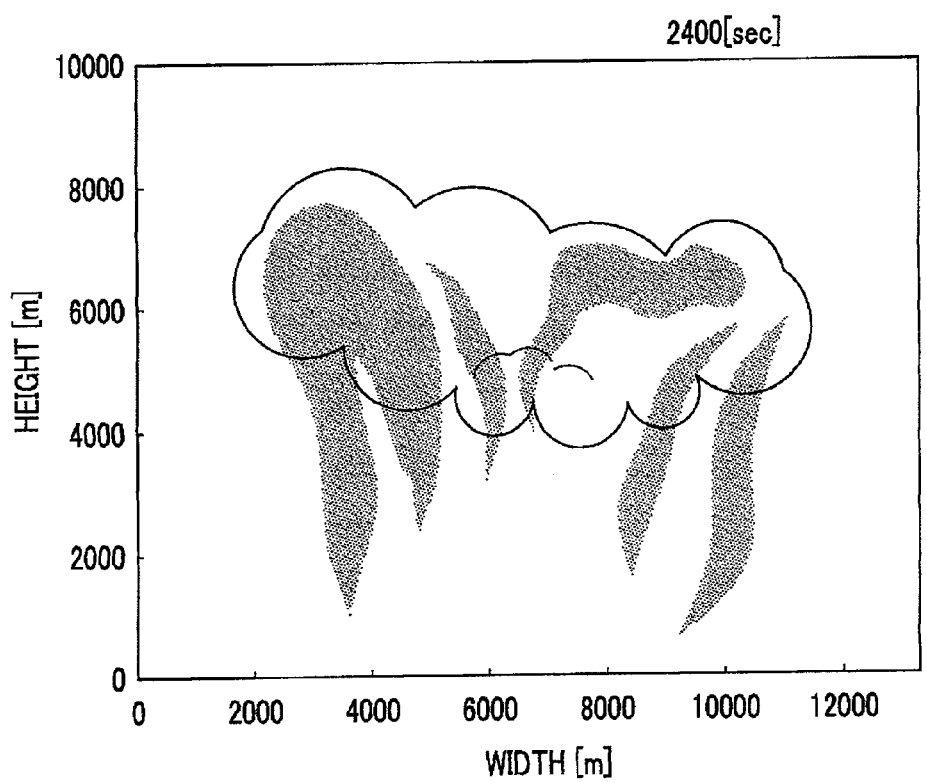
FIG. 10 is a diagram showing operation results according to the simulator.
Figure 11:
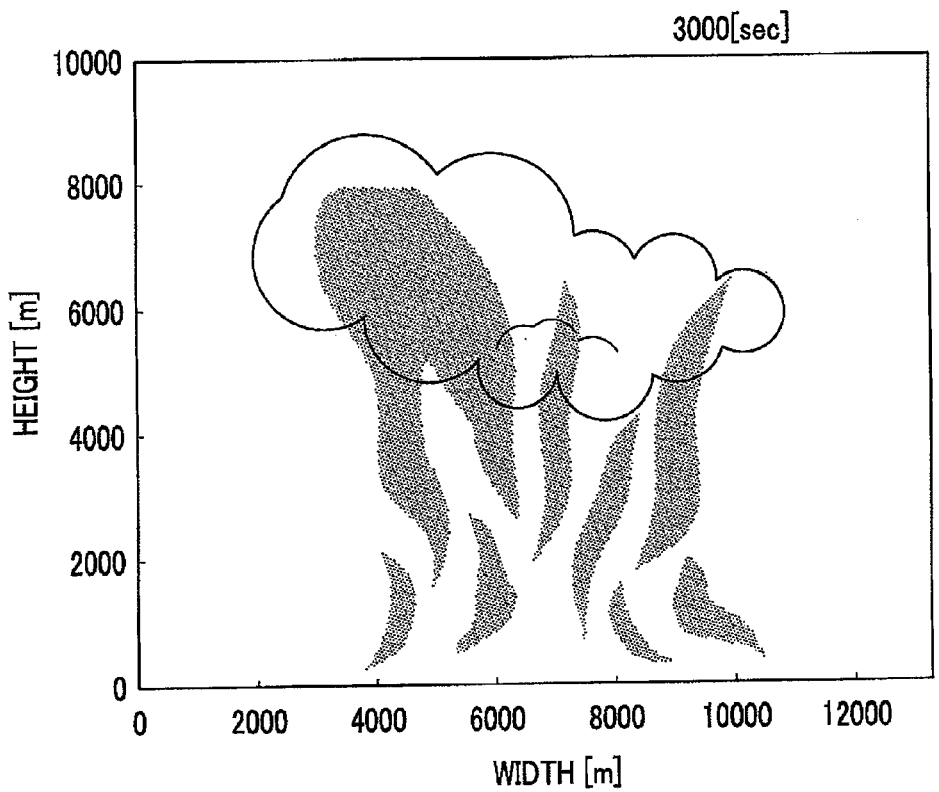
FIG. 11 is a diagram showing operation results according to the simulator.
Figure 12:
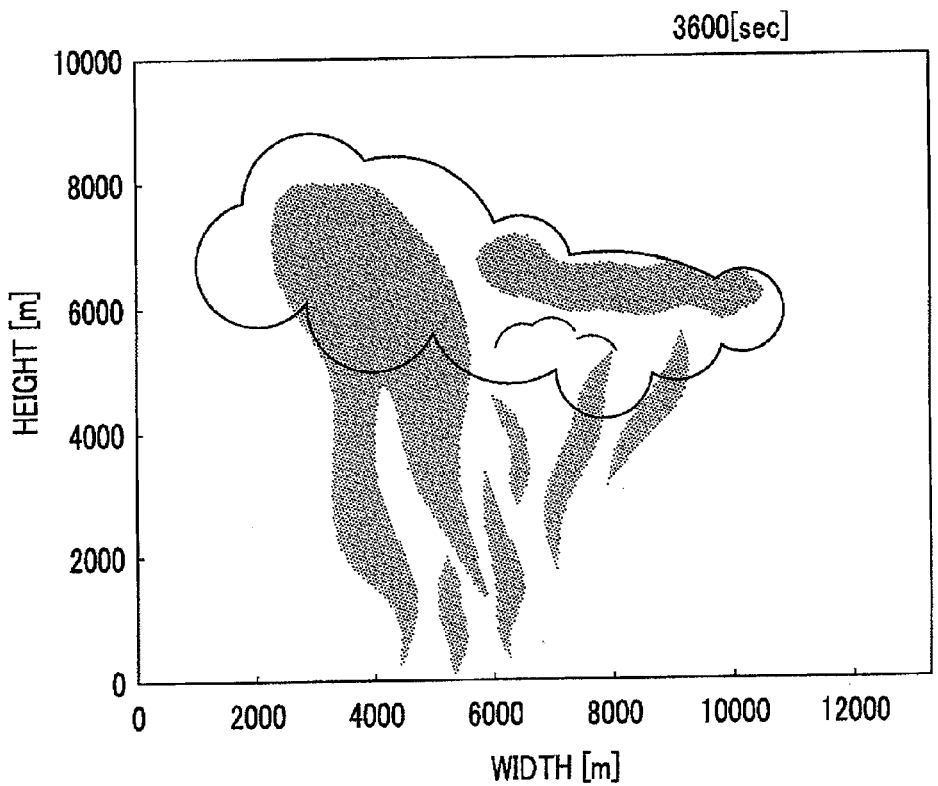
FIG. 12 is a diagram showing operation results according to the simulator.
Figure 13:
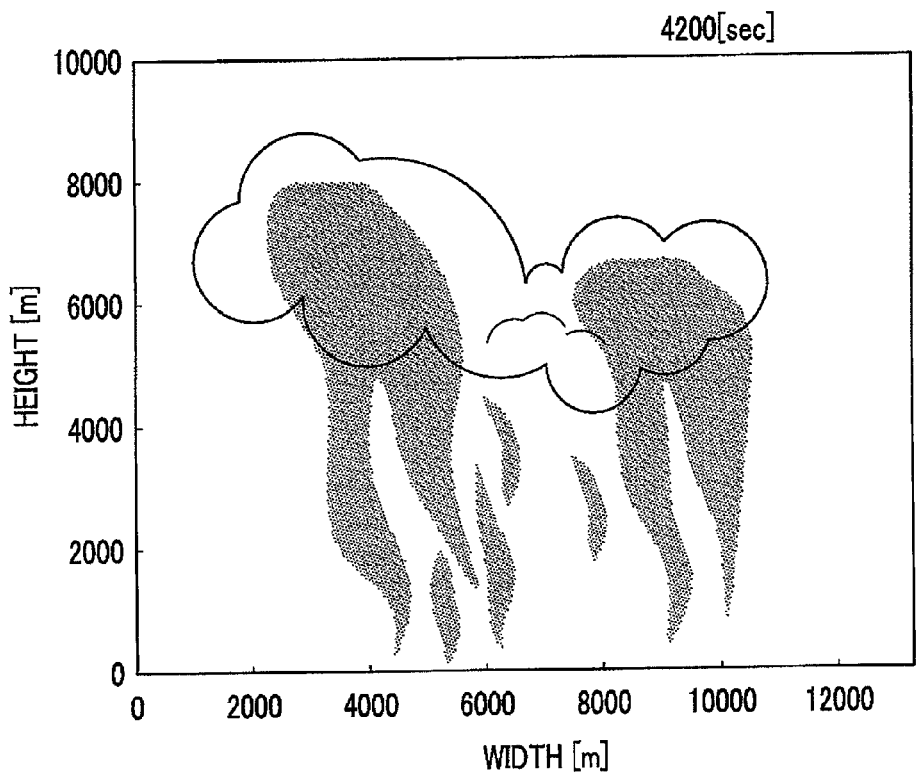
FIG. 13 is a diagram showing operation results according to the simulator.
Figure 14:
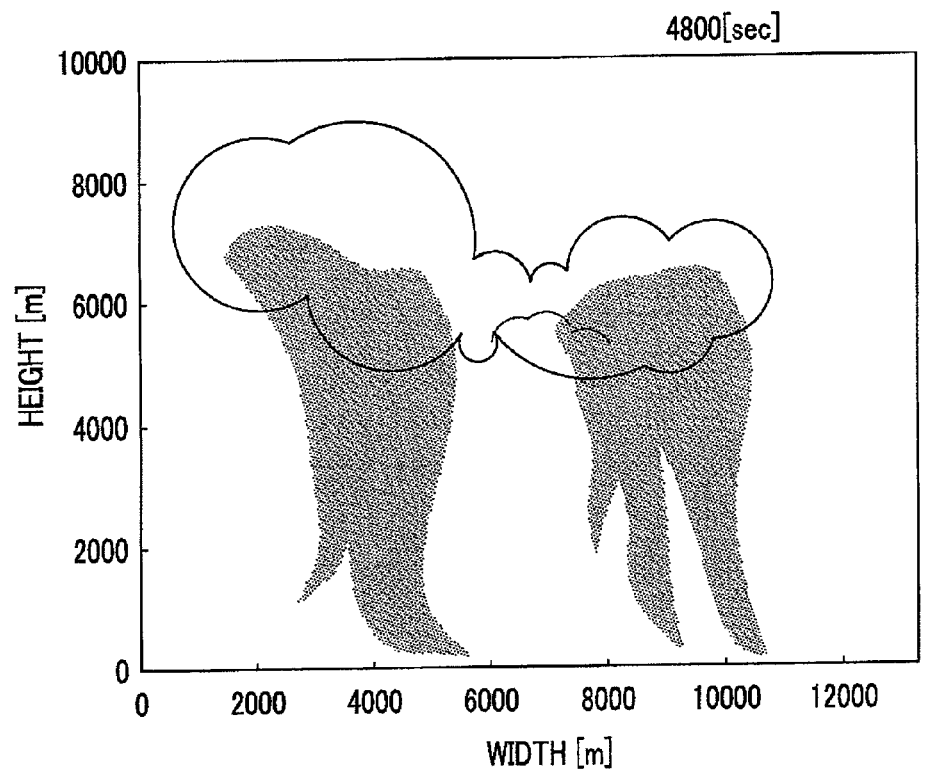
FIG. 14 is a diagram showing operation results according to the simulator.
Figure 15:
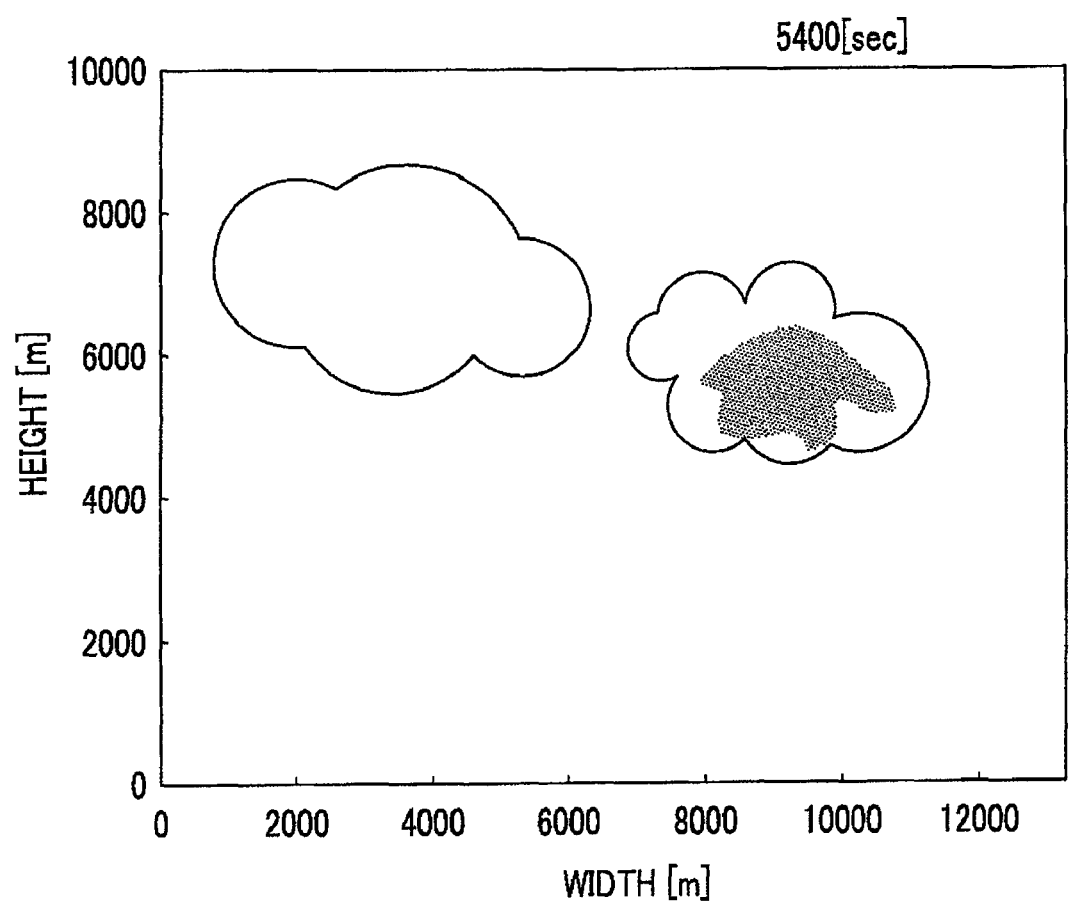
FIG. 15 is a diagram showing operation results according to the simulator.

FIG. 7 shows a state 600 [sec] after an initial time 0 [sec].
FIG. 8 shows a state 1200 [sec] after the initial time 0 [sec].
FIG. 9 shows a state 1800 [sec] after the initial time 0 [sec].
FIG. 10 shows a state 2400 [sec] after the initial time 0 [sec].
FIG. 11 shows a state 3000 [sec] after the initial time 0 [sec].
FIG. 12 shows a state 3600 [sec] after the initial time 0 [sec].
FIG. 13 shows a state 4200 [sec] after the initial time 0 [sec].
FIG. 14 shows a state 4800 [sec] after the initial time 0 [sec].
FIG. 15 shows a state 5400 [sec] after the initial time 0 [sec].

As shown in FIGS. 7-15, in a space where there is nothing but air, invisible water-droplets collide and coalesce with one another and/or condense and grow to form a cloud. Consequently, it starts raining at a certain time (at an approximately 1800 sec) and continues raining until a certain time (at an approximately 5400 sec).

(Enhancement of Super-Water-Droplet-Based Model to Super-particle-Based Model)

Above description of the simulator 1 has been given to the case of simulating the changes in the real-water-droplet as the time elapses using the super-water-droplet-based model. Next, there will be described a case where an object to be simulated is generalized from the real-water-droplet to a real-particle, in other words, a case of enhancing the method using the super-water-droplet-based model to a method (a super-particle method) using a super-particle-based model.

When a lot of real-particles repeat collision-coalescence in fluid, the super-particle method is used to numerically simulate changes of the real-particle over elapsed time. In general, when a "system" which is an object to be numerically simulated meets the requirements described below, the super-particle method can be applied to the system.

In the "system", there is a concept of "time-space" based on time t and space $\vec{r}$. It is assumed that $d_r$ expresses a dimension of the space $\vec{r}$, and the dimension $d_r$ is expressed by an arbitrary positive integer greater than or equal to one.

First of all, assuming that there are N real-particles in the space $\vec{r}$, N is a function of the time t and defined as N=N(t). Moreover, it is assumed that each real-particle has a group of $m_p$ attributes which are expressed by $\vec{A}=(A^{(1)}, A^{(2)}, \ldots, A^{(m_p)})$. Here, since the real-particle moves in the space, the group of attributes includes at least a velocity $\vec{v}$ of the real-particle. Thus, 1-$d_r$-th attributes are assumed to express the velocity so that $\vec{v}=(A^{(1)}, A^{(2)}, A^{(d_r)})$. However, when $\vec{v}$ is uniquely determined as a function of other attributes similarly to the case of the super-water-droplet, $\vec{v}$ may not be included explicitly in the group of attributes.

Moreover, each real-particle has position coordinates $\vec{q}$ in the space. The position coordinates are expressed by $\vec{q}=(q^{(1)}, q^{(2)}, \ldots q^{(d_r)})$. Accordingly, the positions and the groups of attributes of all real-particles are specified by $(\vec{q}_i, \vec{A}_i)$ (i=1, 2, ..., N). Meanwhile, the position and the group of attributes of each real-particle change over elapsed time. Therefore, the position and the group of attributes of the real-particle are functions of the time and expressed by $\vec{q}_i = \vec{q}_i(t)$, $\vec{A}_i = \vec{A}_i(t)$, i=1, 2, ..., N.

In addition, the space $\vec{r}$ is assumed to be filled with fluid. And, the fluid is characterized by $m_f$ fluid field variables $\vec{a}$ where $\vec{a} = (\vec{a}^{(1)}, \vec{a}^{(2)}, \ldots, \vec{a}^{(m_f)})$. Since the fluid field variables $\vec{a}$ are a function of the time and the space, $\vec{a} = \vec{a}(\vec{r}, t)$.

Moreover, it is assumed that a time evolution equation shown in EXPRESSION 18 below is given for the group of attributes $\vec{A}$ of the real-particle. EXPRESSION 18 corresponds to the time evolution equation of attributes for the real-particle and the super-particle.

$$\frac{d}{dt}\vec{A} = \vec{F}(\vec{A}, \vec{a}(\vec{q}, t))$$  [EXPRESSION 18]

In EXPRESSION 18, $\vec{F}(\vec{A}, \vec{a}(\vec{q}, t))=(F^{(1)}(\vec{A}, \vec{a}(\vec{q}, t)), F^{(2)}(\vec{A}, \vec{a}(\vec{q}, t)), \ldots, F^{(m_p)}(\vec{A}, \vec{a}(\vec{q}, t)))$. In general, $\vec{F}$ depends on also the fluid field $\vec{a}(\vec{q}, t)$ at the position $\vec{q}$ where the real-particle is located. Moreover, this time evolution equation group determines how the real-particle behaves in the fluid field (a velocity at which the real-particle moves, for instance). Accordingly, the position $\vec{q}$ of the real-particle changes depending on the velocity and in accordance with EXPRESSION19 shown below. EXPRESSION19 corresponds to the time evolution equation of position coordinates for the real-particle and the super-particle.

$$\frac{d}{dt}\vec{q} = \vec{v} \qquad \text{[EXPRESSION 19]}$$

Moreover, a time evolution equation group of the fluid field $\vec{a}$ is given in the form of an integrodifferential equation as shown in EXPRESSION 20 below. The equation shown in EXPRESSION 20 corresponds to time evolution equation of fluid field for the real-particle.

$$\frac{\partial}{\partial t}\vec{a}(\vec{r}, t) = \vec{f}(\vec{a}(\vec{r}, t), \vec{S}(\vec{r}, t)) \qquad \text{[EXPRESSION 20]}$$

In EXPRESSION 20, a term of $\vec{S} = (S^{(1)}, S^{(2)}, \ldots, S^{(m_f)})$, which expresses interaction from the real-particle to the fluid, is determined in accordance with the positions and the groups of attributes of all the real-particles, and therefore, $\vec{S}(\vec{r}, t) = \vec{S}(\vec{A}_1, \vec{A}_2, \ldots, \vec{A}_N, \vec{q}_1, \vec{q}_2, \ldots \vec{q}_N, \vec{r}, t) = \vec{S}(\{\vec{A}_i, \vec{q}_i\}, \vec{r}, t)$.

The real-particles probabilistically collide and coalesce with one another. In other words, two real-particles j and k in a sufficiently small divided space (a cell) with a volume of ΔV collide and coalesce with one another in a time interval Δt sufficiently shorter than the time t by a probability given by EXPRESSION 21 shown below.

$$P_c(\vec{A}_j, \vec{A}_k) = C\left(\vec{A}_j, \vec{A}_k, \vec{a}(\vec{r}, t)\right)\frac{\Delta t}{\Delta V}|\vec{v}_j - \vec{v}_k| \qquad \text{[EXPRESSION 21]}$$

In EXPRESSION 21, $C(\vec{A}_j, \vec{A}_k, \vec{a}(\vec{r}, t))$, which is an effective cross section where the real-particles are possible to collide and coalesce with one another, is a function of the groups of attributes $\vec{A}_j$ and $\vec{A}_k$ of the two real-particles and the fluid field $\vec{a}(\vec{r}, t)$ in the divided space. Here, the volume ΔV is sufficiently small. Therefore, even when the fluid field is evaluated at any position in the divided space, an error margin about $\vec{r}$ is extremely small and high-order. Accordingly, EXPRESSION 21 can be applied at an arbitrary position in the divided space. It is also possible to express as $\vec{r} := (\vec{q}_j + \vec{q}_k)/2$.

It is defined that "real-particles collide and coalesce with one another" means that two real-particles collide and coalesce with one another to form a new real-particle.

The new real-particle is also a real-particle characterized with a group of attributes $\vec{A}$. In general, what kind of group of attributes $\vec{A}'$ the new real-particle has as a result of the collision-coalescence between the real-particles is also probabilistically determined. In other words, it is assumed that there is given a probability distribution $p_c(\vec{A}_j, \vec{A}_k; \vec{A}')$ of a probability that a new real-particle with a group of attributes $\vec{A}'$ is formed under a condition that real-particles with groups of attributes $\vec{A}_j$ and $\vec{A}_k$ have collided and coalesced with one another.

The real-particle which is newly formed from the collision-coalescence is assumed to be located somewhere in the divided space ΔV in which the collision-coalescence has occurred. Accordingly, a position $\vec{q}'$ of the real-particle assumed to be determined probabilistically or deterministically. In general, a probability distribution of a probability that under a condition that a real-particle $(\vec{A}_j, \vec{q}_j)$ and a real-particle $(\vec{A}_k, \vec{q}_k)$ have collided and coalesced with one another to form a new real-particle with a group of attributes $\vec{A}'$, the newly formed real-particle is located at a position $\vec{q}'$ is assumed to follow $\theta_c(\vec{A}_j, \vec{A}_k, \vec{q}_j, \vec{q}_k, \vec{A}', \Delta V; \vec{q}')$.

Meanwhile, it is also possible to assume a process of breaking up (collisional breakup) when real-particles collide with one another. In this case, a probability that two real-particles j and k in a divided space with a sufficiently small volume ΔV in the entire space collide with one another and break up in a sufficiently short time interval Δt is given by EXPRESSION 22 shown below.

$$P_S(\vec{A}_j, \vec{A}_k) = S\left(\vec{A}_j, \vec{A}_k, \vec{a}(\vec{r}, t)\right)\frac{\Delta t}{\Delta V}|\vec{v}_j - \vec{v}_k| \qquad \text{[EXPRESSION 22]}$$

In EXPRESSION 22, $S(\vec{A}_j, \vec{A}_k, \vec{a}(\vec{r}, t))$ expresses an effective cross section where the real-particles are possible to collide with one another and break up. The collisional breakup means that two real-particles collide with one another to form two or more new real-particles with new groups of attributes. It is assumed that each of the new real-particles is also characterized by a group of attributes which includes a plurality of attributes. In general, how many real-particles with what kinds of groups of attributes are formed as a result of the collisional breakup is also probabilistically determined.

Here, it is assumed that there is given a probability distribution $p_s(\vec{A}_j, \vec{A}_k; \vec{A}'^{[1]}, \vec{A}'^{[2]}, \ldots, \vec{A}'^{[n]})$ of a probability that n real-particles respectively having n groups of attributes ($\vec{A}'^{[1]}, \vec{A}'^{[2]}, \ldots, \vec{A}'^{[n]}$) are formed under a condition that a real-particle with a group of attributes $\vec{A}_j$ and a real-particle with a group of attributes $\vec{A}_k$ have collided with one another and broken up.

In addition, there may be a single breakup of a real-particle. The single breakup means that a single real-particle with a group of attributes $\vec{A}$ is broken up into two or more new real-particles without collision. The new n real-particles respectively have groups of attributes ($\vec{A}'^{[1]}, \vec{A}'^{[2]}, \ldots, \vec{A}'^{[n]}$). The process of the single breakup follows a probabilistic or deterministic law.

A general description has been given to a "system in which a lot of real-particles repeat a collision-coalescence in fluid", above. Next, there will be described a case of applying the system to the super-particle method.

In the super-particle method, when processes of the collisional breakup are more dominant than processes of the collision-coalescence, a total number of the super-particles is assumed to rapidly increase over elapsed time in numerical simulation using the super-particle method so that the computation efficiency may be lowered.

Furthermore, in the super-particle method, when breakup processes of the single breakup is more dominant than processes of the collision-coalescence and processes of the collisional breakup, the total number of the super-particles is assumed to rapidly increase over elapsed time in numerical simulation using the super-particle method so that the computation efficiency may be lowered.

Figure 16:
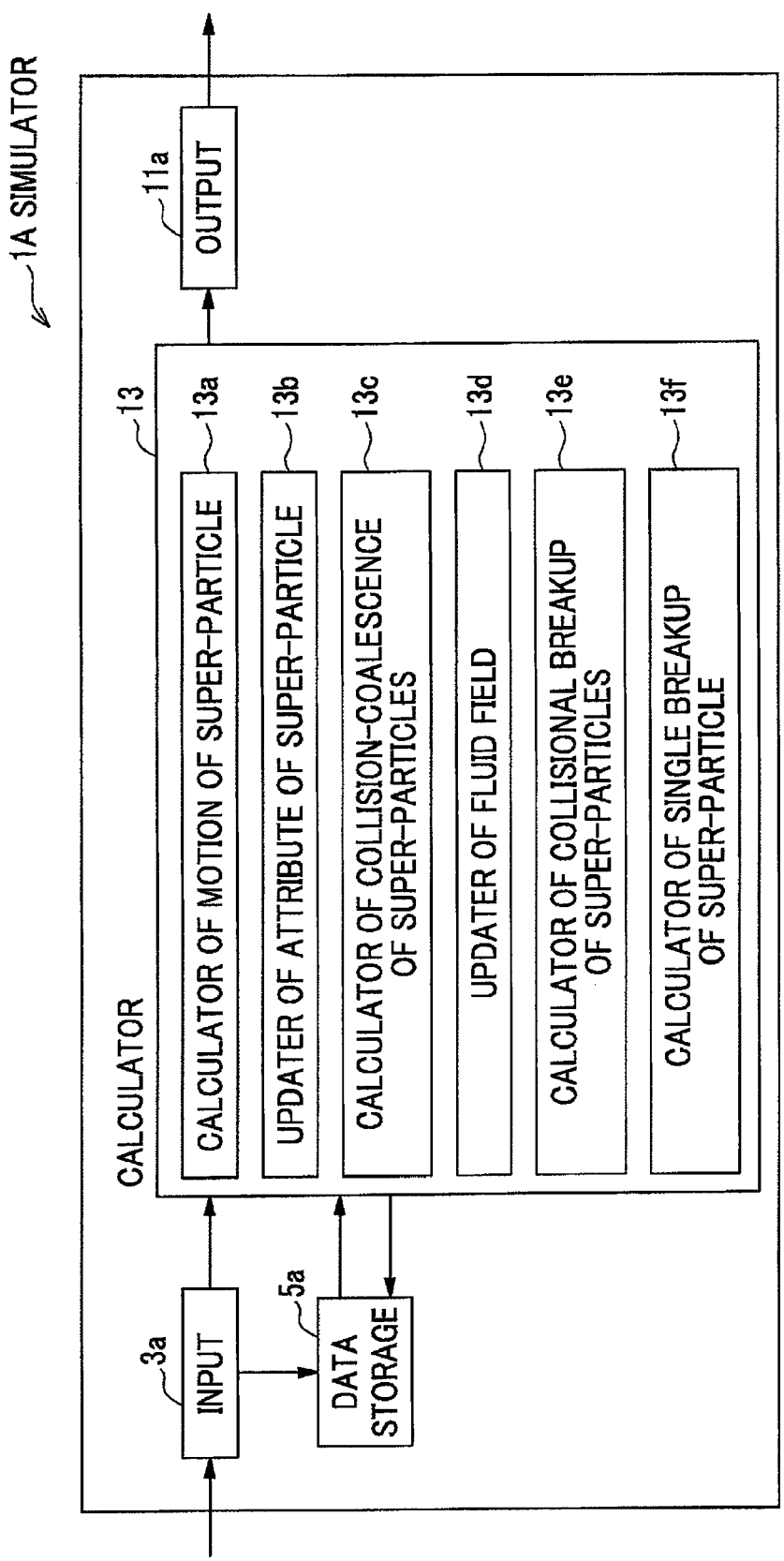
FIG. 16 is a block diagram of a simulator (in a case of being applied to the super-particle method) according to another embodiment of the present invention.

Next, description will be given to a case of applying the simulator 1 shown in FIG. 1 to the super-particle-based model, referring to FIG. 16. As shown in the FIG. 16, a simulator 1A performs simulation using the super-particle and the super-particle-based model (the super-particle method) as described above. The simulator 1A includes an input (an input means) 3*a*, a data storage (a data storage means) 5*a*, a calculator (a calculation means) 13, and an output (an output means) 11*a*. A part of the following description of the simulator 1A may overlap with the description of the super-particle method above. Here, there will be described a case of realizing the super-particle method by the simulator.

Before the simulator 1A is described, the super-particle method associated with the "system" is described, below. The super-particle method is regarded as one of methods which abstract (, outline, or generalize) needlessly detailed features with a great degree of freedom in the "system". Moreover, real-particles can be regarded as a lot of discrete particles which disperse in the fluid. Description will be given to a case where the simulator 1A simulates a "system in which a lot of discrete particles repeat collision-coalescence in fluid", which is applied to the "super-particle" (as a super-particle-based system).

First of all, definition of a time-space in the super-particle-based system is equivalent to that in the original "system in which a lot of discrete particles repeat collision-coalescence in fluid". It is assumed that there are $N_s$ super-particles in the time-space. Each super-particle i has a position in the space and a group of $m_p$ attributes ($\vec{q}_i, \vec{A}_i$) similarly to the real-particle. Moreover, the super-particle has a multiplicity $n_i$, where $n_i$ is an arbitrary positive integer and $i=1, 2, 3, \ldots, N_s$. The multiplicity $n_i$ expresses that the super-particle i includes $n_i$ real-particles. Then, a state of each of the all super-particles is expressed by the position, the group of attributes, and the multiplicity, and therefore determined by ($\vec{q}_i, \vec{A}_i, n_i$), $i=1, 2, 3, \ldots, N_s$. Thus, the total number of real-particles represented by the super-particles is expressed by EXPRESSION 23 shown below.

$$N = \sum_{i=1}^{N_s} n_i \qquad \text{[EXPRESSION 23]}$$

Moreover, the group of attributes $\vec{A}$ and the position $\vec{q}$ of the super-particle are time-evolved in accordance with EXPRESSION 18 and EXPRESSION 19 similarly to the real-particle. Fluid field $\vec{a}$ also follows the time evolution equation similar to that in the original system. However, the term of interaction from the super-particle to the fluid is evaluated by the real-particles which are expressed by the super-particle, and expressed by EXPRESSION 24 shown below. EXPRESSION 24 corresponds to the time evolution equation of fluid field for the super-particle.

$$\frac{\partial}{\partial t}\vec{a}(\vec{r}, t) = \vec{f}\left(\vec{a}(\vec{r}, t), \vec{S}(\vec{r}, t)\right) \qquad \text{[EXPRESSION 24]}$$

In EXPRESSION 24, $\vec{S}(\vec{r}, t)$ is a term to express interaction (amounts of interaction) from the super-particle to the fluid. The term is defined by EXPRESSION 25 shown below using the interaction term $\vec{S}$ in the original system where $\{\vec{A}_i, \vec{q}_i\}_r$ expresses the all N particles expressed by the all $N_s$ super-particles.

$$\vec{S}(\vec{r}, t) := \vec{S}(\{\vec{A}_i, \vec{q}_i\}_r, \vec{r}, t) \qquad \text{[EXPRESSION 25]}$$

Moreover, collision-coalescence between the super-particles is defined as follows. First of all, it is assumed that super-particles with multiplicities of $n_j$ and $n_k$ (>$n_j$) collide and coalesce with one another. Then, a super-particle with a group of attributes $\vec{A}_k$ and a multiplicity of $n_k - n_j$ and a super-particle with a group of attributes $\vec{A}'$ and a multiplicity of $n_j$ are assumed to be formed. On the other hand, assuming a case of $n_k = n_j$, super-particles one of which has a multiplicity of "$[n_j/2]$", the other of which has a multiplicity of $n_j - $"$[n_j/2]$", and both of which have a group of attributes $\vec{A}'$ are assumed to be formed. Accordingly, in either case, merely $\min(n_j, n_k)$ pairs of real-particles with $\vec{A}_j$ and $\vec{A}_k$ collide and coalesce with one another to form $\min(n_j, n_k)$ real-particles with a group of attributes $\vec{A}'$.

With this assumption, a probability of collision-coalescence of super-particles is given by EXPRESSION 26 shown below.

$$P_c^{(s)}\begin{pmatrix}\vec{A}_j, \vec{A}_k, \\ n_j, n_k\end{pmatrix} := \max(n_j, n_k) P_c(\vec{A}_j, \vec{A}_k) \qquad \text{[EXPRESSION 26]}$$

$$= \max(n_j, n_k) C\begin{pmatrix}\vec{A}_j, \vec{A}_k, \\ \vec{a}(\vec{r}, t)\end{pmatrix}$$

$$\frac{\Delta t}{\Delta V}|\vec{v}_j - \vec{v}_k|$$

Two super-particles j and k in a space with a volume $\Delta V$ which is sufficiently smaller than a space-scale of fluid field $\vec{a}$ in the entire space, collide and coalesce with one another in a time interval $\Delta t$ which is sufficiently shorter than the time t by the probability of collision-coalescence shown in EXPRESSION 26.

The group of attributes $\vec{A}'$ of the super-particle newly formed as a result of the collision-coalescence is a group of amounts probabilistically determined and defined to follow the probability distribution $p_c(\vec{A}_j, \vec{A}_k; \vec{A}')$ similarly to the original system. Thus, an expectation value of the number of collision-coalescences between real-particles is reproduced by the definition above. Here, assuming that there are $n_j$ and $n_k$ real-particles, $n_j n_k$ pairs of real-particles are to be formed in total. Since each pair of real-particles collide and coalesce with one another by the probability of $P_c$, the expectation value of the number of collision-coalescences is $n_j n_k P_c$.

On the other hand, the collision-coalescence between super-particles expresses $\min(n_j, n_k)$ collision-coalescences between real-particles. Accordingly, the expectation value of the number of collision-coalescences between real-particles which are expressed by the collision-coalescences between the super-particles is $\min(n_j, n_k)P_c^{(s)} = \min(n_j, n_k)\max(n_j, n_k)P_c = n_j n_k P_c$. Therefore, it is validated that the expectation value in the original system is reproduced by the collision-coalescences between the super-particles.

As described above, the "super-particle-based system" is defined. The system approximately expresses the original system. Here, it is expected that a sufficiently large total number $N_s$ of super-particles, that is, a sufficiently small multiplicity reproduces phenomena to be simulated with optimal approximation. In other words, when multiplicities of all the super-particles become one, the "super-particle-based system" is identical to the original system.

The "super-particle-based system" is characterized by that the total number of the super-particles seldom decreases while the total number of the real-particles in the original system decreases in the collision-coalescence process. The multiplicity of the super-particle decreases instead of that the total number of the super-particles seldom decreases in the collision-coalescence process. As a particular case, when super-particles with a multiplicity of $n_j = n_k = 1$ collide and coalesce with one another, a super-particle with a multiplicity of zero is formed and the total number of super-particles decreases.

Small change in the total number of the super-particles indicates that the "super-particle-based system" always well approximates the "original system". In this meaning, the super-particle method is an appropriate numerical calculation model of a system in which collision-coalescence is repeated. A larger number of super-particles bring about better approximation.

Next, time evolutions (changes over elapsed time) other than the time evolutions for the collision-coalescence between the super-particles are calculated based on EXPRESSIONS 18 and 19. The time evolution of fluid field $\vec{a}(\vec{r}, t)$ is calculated based on EXPRESSION 24. The collision-coalescence process of super-particle is calculated in accordance with the Monte Carlo method described below.

First of all, the space where the super-particles exist is divided into grids (predetermined cells) (which correspond to the divided spaces in the super-water-droplet method) with a volume sufficiently smaller than a space-scale in a fluid field. Then, super-particles in each grid collide and coalesce with one another by a probability $P_c^{(s)}$ given by EXPRESSION 26. In consideration of the above, the collision-coalescence process of super-particles is numerically simulated in a manner of Monte Carlo. In other words, a random number is actually generated to make the super-particles in the identical grid collide and coalesce with one another. Operation of collision-coalescence at a time t is performed as described below.

First, positions of super-particles at a time t (an initial time t=0, for instance) are specified and then grouped into the grids. For instance, assuming that there are $\overline{N}_s$ super-particles in a certain grid, and that each super-particle $1=1, 2, \ldots, \overline{N}_s$ has a multiplicity of $n_1$, a pair of two super-particles (j and k) are selected using the random numbers from the all super-particles. Details of the operation to select the pair are similar to those in the case of the super-water-droplet. Thus, the pair is a candidate pair of collision-coalescence. When there are an odd number of super-particles in the grid, one of the super-particles is included in none of the candidate pairs of collision-coalescence. Therefore, the greatest integer which does not exceed $\overline{N}_s/2$, that is, "$[\overline{N}_s/2]$" pairs are generated.

Basically, all combinations of the super-particles in the grid are possible to collide with one another. Therefore, it is required to determine probabilities of collision-coalescences between the all possible $\overline{N}_s(\overline{N}_s-1)/2$ combinations of pairs of super-particles.

However, the number of the all possible pairs is so large that computation efficiency becomes low. Therefore, "$[\overline{N}_s/2]$" pairs of super-particles are used to represent the all possible pairs so as to reduce a computational cost. Thus, the computational cost increases on the order of not $N_s^2$ but $N_s$. To compensate for the reduced number of pairs which collide and coalesce with one another, the collision probability is increased and adjusted to reproduce an expectation value of the number of collision-coalescences in the grid. In other words, a probability of collision-coalescence between i-th pair of super-particles is assumed to be $$p_i := \frac{\overline{N}_s(\overline{N}_s-1)}{2[\overline{N}_s/2]} P_c^{(s)}(\vec{A}_j, \vec{A}_k) = \max(n_j, n_k) \frac{\overline{N}_s(\overline{N}_s-1)}{2[\overline{N}_s/2]} P_c(\vec{A}_j, \vec{A}_k).$$

Then, the expectation value of the total number of collision-coalescences in the grid is reproduced by EXPRESSION 27 shown below.

$$\sum_{i=1}^{[N_s/2]} \min(n_{ji}, n_{ki}) p_i \cong \quad \text{[EXPRESSION 27]}$$

$$\sum_{j=1}^{N_s} \sum_{k=1}^{N_s} \frac{1}{2} \min(n_j, n_k) P_c^{(s)}(\vec{A}_j, \vec{A}_k)$$

Moreover, the following calculation is performed for all the candidate pairs of collision-coalescences $i=1, \ldots, "[\overline{N}_s/2]$". Assuming that a random number Ran $\in (0, 1)$, $\gamma$ is given by EXPRESSION 28 shown below.

$$\gamma = \begin{cases} [p_i] + 1 & \text{if } Ran < p_i - [p_i] \\ [p_i] & \text{if } Ran \geq p_i - [p_i] \end{cases} \quad \text{[EXPRESSION 28]}$$

$\gamma$ expresses the number of virtual collisions between a pair (j, k) of super-particles in a time from t to t+$\Delta$t. Basically, $\gamma$ should be either of zero (no collision-coalescence occurs) or one (a collision-coalescence occurs). However, for efficient numerical calculation, a case where the super-particles collide with one another for plural times is also taken into consideration. If $\gamma=0$, no calculation is performed for the i-th pair of super-particles. Meanwhile, if $\gamma \neq 0$, calculation shown in EXPRESSION 29 below is performed for the i-th pair of super-particles. EXPRESSION 29 represents the Monte Carlo calculation for the super-particle.

if $\gamma \neq 0$ (a) if $n_j > n_k$ $m := \min(\gamma, [n_j/n_k])$ i. if $n_j - mn_k > 0$ $$\vec{A}'_j = \vec{A}_j, \quad \vec{q}'_j = \vec{q}_j, \quad n'_j = n_j - mn_k,$$

$$\vec{A}'_k = \vec{A}'_m, \quad \vec{q}'_k = \vec{\tilde{q}}_m, \quad n'_k = n_k$$

ii. if $n_j - mn_k = 0$ $$n'_j = [n_k/2], \quad n'_k = n_k - [n_k/2],$$

$$\vec{A}'_j = \vec{A}'_k = \vec{\tilde{A}}'_m,$$

$$\vec{q}'_j \vec{q}'_k = \vec{\tilde{q}}'_m \qquad \text{[EXPRESSION 29]}$$

Here, a symbol with "'" expresses a value updated after the collision-coalescence. $\vec{\tilde{A}}_\eta$, $\eta = 0, 1, \ldots, m$ expresses a probability variable according to a probability distribution $p_c(\vec{A}_j, \vec{\tilde{A}}_{\eta-1}; \vec{\tilde{A}}_\eta)$, and it is assumed that $\vec{\tilde{A}}_0 = \vec{A}_k$. A random number is generated as $\{\vec{\tilde{A}}_\eta\} = \{\vec{A}_k = \vec{\tilde{A}}_0, \vec{\tilde{A}}_1, \ldots, \vec{\tilde{A}}_{m-1}, \vec{\tilde{A}}_m = \vec{A}'_k\}$ to probabilistically determine the updated value. This determines the group of attributes $\vec{A}'_k$ of the super-particle k which has collided and coalesced with the super-particle j for m times.

Similarly, $\vec{\tilde{q}}_\eta$, $\eta = 0, 1, \ldots m$ expresses a probability variable according to a probability distribution $\theta_c(\vec{A}_j, \vec{\tilde{A}}_{\eta-1}, \vec{\tilde{q}}_j, \vec{\tilde{q}}_{\eta-1}, \vec{\tilde{A}}_\eta, \Delta V; \vec{\tilde{q}}_\eta)$, and it is assumed that $\vec{\tilde{q}}_0 = \vec{q}_k$. A random number is generated as $\{\vec{\tilde{q}}_\eta\} = \{\vec{q}_k = \vec{\tilde{q}}_0, \vec{\tilde{q}}_1, \ldots, \vec{\tilde{q}}_{m-1}, \vec{\tilde{q}}_m = \vec{q}'_k\}$ to probabilistically determine the updated value. This determines the position $\vec{q}'_k$ of the super-particle k which has collided and coalesced with the super-particle j for m times.

When $n_j \leq n_k$, j is swapped by k, and similar operations are performed. These operations are processed for all the grids. Here, the super-particle whose multiplicity becomes zero is removed. After that, operations of all the collision-coalescences at the time t have been completed so that a state at the time $t + \Delta t$ is obtained.

In these operations, there are used generalized calculations of the calculator of microphysics model 7 and the calculator of fluid dynamics model 9 in the super-water-droplet method applied to the cloud formation and the rainfall phenomenon. In the cloud formation and the rainfall phenomenon, EXPRESSION 30 shown below occurs by $p_c = 1$, that is, a probability of 100%. Therefore, no random number is required, and a group of attributes expressed by EXPRESSION 31 are deterministically obtained.

$$R' = (mR_j^3 + R_k^3)^{1/3}, \quad M' = (mM_j + M_k) \qquad \text{[EXPRESSION 30]}$$

$$\vec{A}_m = ((mR_j^3 + R_k^3)^{1/3}, (mM_j + M_k)) \qquad \text{[EXPRESSION 31]}$$

In addition, in a case of the super-water-droplet method, in EXPRESSION 29, to update the position of the super-water-droplet, the position before the position is updated is set as the updated position after the collision-coalescence as follows: $\vec{q}'_j = \vec{q}_j$ and $\vec{q}'_k = \vec{q}_k$.

By the way, $\vec{r}$ of the super-water-droplet corresponds to $\vec{q}$ of the super-particle.

It is validated (assured) as described below that the super-water-droplet and the super-particle after the collision-coalescence maintain the position before the collision-coalescence.

In the super-water-droplet applied to the cloud formation and the rainfall phenomenon, there is no important physical aspect in a concrete functional form of the conditional probability distribution $\theta_c(\vec{A}_j, \vec{A}_k, \vec{q}_j, \vec{q}_k, \vec{A}', \Delta V; \vec{q}')$ which determines the position $\vec{q}'$ of the super-water-droplet generated from the collision-coalescence. In other words, it is supposed that the cloud formation or the rainfall phenomenon reproduced by the numerical simulation little depends on how $\theta_c$ is given (a change as small as $\Delta V$ in a position of each real-water-droplet represented by the super-water-droplet little influences the cloud formation and the rainfall phenomena).

In view of modeling a physical phenomenon (modeling the cloud microphysics), an idea that the collision-coalescence probabilistically occurs is grounded on such a nature of the phenomenon that the position of the real-water-droplet is unstable and unclear in a space with volume $\Delta V$ which is sufficiently smaller than a scale of spatial variation in the fluid field. By the way, the scale of the spatial variation indicates a length of a space within which the fluid field is assumed to change uniformly. For instance, the scale of the spatial variation is a length of a space in which temperature of the fluid field is considered to be steady or in which wind velocity is considered to be constant.

Accordingly, if a change in $\theta_c$, that is, a change in the position of the real-water-droplet in $\Delta V$ greatly changes the reproduced physical phenomenon, the assumption that the real-water-droplets probabilistically collide and coalesce with one another is inappropriate. Thus, in consideration of the above-described reason and an advantage of a simple numerical calculation, it is assumed that the super-water-droplet and the super-particle after the collision-coalescence maintain the position before the collision-coalescence.

Next, there will be described a configuration of the simulator 1A. There are options for an implementation method of applying the super-particle method to simulation. Below, description will be given to an example of more general implementation methods.

Through an input (an input means) 3a, there are input, as initial variables, data relating to the real-particles such as a type, attributes, and so on, data (ambient condition data and fluid variables) relating to fluid in which the real-particles exist, and data (an initial time, a time step (a time interval), and a total calculation time) relating to a computation time.

Each real-particle includes a group of m attributes (physical quantities) which is expressed by $\vec{A} = (A1, A2, A3, \ldots, Am)$. Moreover, each of the attributes changes over elapsed time under influence of the fluid in accordance with the above-described time evolution equations. Here, $dA1/dt = F1(A1, A2, A3, \ldots, Am$, fluid variables), $dA2/dt = F2(A1, A2, A3, \ldots, Am$, fluid variables), ..., and $dAm/dt = Fm(A1, A2, A3, \ldots, Am$, fluid variables). These are combined into $d\vec{A}/dt = \vec{F}(\vec{A})$, where $\vec{F} := (F1, F2, \ldots, Fm)$.

A plurality of real-particles which have an identical group of attributes are represented by a super-particle. Moreover, the number of real-particles represented by the super-particle is expressed by a multiplicity n. Then, the super-particles are assumed to collide and coalesce with one another, collide with one another and break up, or singly break up by a certain probability. In other words, in a case of the collision-coalescence, for instance, the super-particles probabilistically collide and coalesce with one another. In addition, a newly formed super-particle is also characterized by an attribute group $\vec{A}$.

The smaller the multiplicity n is, the more highly accurate the simulation according to the simulator 1A is. By the way, when n=1, a single super-particle is equivalent to a single real-particle. To decrease the multiplicity n, the total number of the super-particles is increased, which results in a high computational cost. In the simulator 1A, to lower the computational cost while maintaining the accuracy of the simulation by some extent, a standard of how small the multiplicity n should be, that is, how many super-particles are required is estimated by the distribution function of the super-particles which reproduces the original distribution function using a histgram with a bin width of approximately ϵ.

However, when the simulator 1A performs the simulation in practice, n merely needs to be sufficiently small to appropriately reproduce a phenomenon (such as, for instance, behaviors and the like of dusts, microbubbles, and so on) to be simulated. For instance, in a case of simulating a phenomenon that minuscule dusts coalesce with one another to form a large dust and fall onto the floor face or the like, n is specified as follows. In the simulator 1A, subsequently to a first simulation, n having a value a little different from that used in the first simulation is used to perform a second simulation. Thus, when results of the second simulation are scarcely different from those of the first simulation, the value of n is considered to be sufficiently small.

The data storage 5a stores the data relating to the real-particles such as the types, the attributes, and so on of the real-particles input through the input 3a, the data (the ambient condition data and the fluid variables) relating to the fluid in which the real-particles exist, and data in progress of being calculated by the calculator 13 and outputs the data as necessary. The data storage 5a includes a general memory, a hard disk, and so on.

The calculator 13 calculates a time evolution (a change over elapsed time) of each attribute of the super-particle. The calculator 13 includes a calculator of motion of super-particle (a calculation means of motion of super-particle) 13a, an updater of attribute of super-particle (an update means of attribute of super-particle) 13b, a calculator of collision-coalescence of super-particles (a calculation means of collision-coalescence of super-particles) 13c, an updater of fluid field (an update means of fluid field) 13d, a calculator of collisional breakup of super-particles (a calculation means of collisional breakup of super-particles) 13e, and a calculator of single breakup of super-particle (a calculation means of single breakup of super-particle) 13f.

The calculator of motion of super-particle 13a calculates the velocity of the super-particle using the above-described EXPRESSIONS 18-20.

The updater of attribute of super-particle 13b calculates the group of attributes of the super-particle using the above-described EXPRESSION 29.

The calculator of collision-coalescence of super-particles 13c calculates about the collision-coalescence between the super-particles using the above-described EXPRESSION 26.

The updater of fluid field 13d calculates about the fluid in which the super-particles exist using the above-described EXPRESSIONS 24 and 25.

The calculator of collisional breakup of super-particles 13e calculates about the collisional breakup between the super-particles based on the Monte Carlo calculation using the above-described EXPRESSION 22.

The calculator of single breakup of super-particle 13f calculates about the single breakup of the super-particle which probabilistically or deterministically breaks up into two or more pieces.

In the simulator 1A, when the real-particle to be simulated does not singly break up due to its material properties or situation, it is possible to stop a function of the calculator of single breakup of super-particle 13f from the start. Similarly, in the simulator 1A, it is also possible to stop functions of the calculator of collision-coalescence of super-particles 13c and/or the calculator of collisional breakup of super-particles 13e as necessary.

Next, there will be described a series of flow of calculation by the calculator 13. Each of the attributes of the super-particle is time-evolved in accordance with $d\vec{A}/dt$. And, the super-particle moves freely in the entire space at its own velocity. The calculator of motion of super-particle 13a calculates the velocity.

Moreover, the collision-coalescence of the super-particle is simulated using the above-described Monte Carlo method based on given probabilities of collision-coalescences. In general, to give the probability of collision-coalescence, either one of the effective cross section of collision-coalescence $C(\vec{A}_j, \vec{A}_k, \vec{a}(\vec{r}, t))$ shown in EXPRESSION 21 or a collision efficiency $E_{jk}$ of the super-particle is merely required. EXPRESSION 32 expresses relationship between the effective cross section of collision-coalescence C and the collision efficiency $E_{jk}$ of the super-particle.

$$E_{jk}\pi(R+R_k)^2 = C(\vec{A}_j, \vec{A}_k, \vec{a}) \qquad \text{[EXPRESSION 32]}$$

Then, the calculator of collisional breakup of super-particles 13e and the calculator of single breakup of super-particle 13f respectively calculate about a case where the super-particles collide with one another and break up (collisional breakup) and a case where the super-particle singly breaks up (single breakup). Here, how the super-particle breaks up is determined in accordance with EXPRESSION 22 or another given deterministic equation. Otherwise, a random number is used based on a given probability of breakup to calculate the breakup process in a manner of Monte Carlo.

Here will be described objects to be calculated by the calculator 13.

In the above-described super-water-droplet-based model of the cloud and the rainfall, the real-water-droplet and the moist air respectively correspond to the real-particle and the fluid. The group of attributes of the real-water-droplet includes the radius and the mass of the cloud condensation nucleus. Moreover, the terminal velocity used as the velocity is not an independent attribute. Meanwhile, the time evolution equation of the radius is given by EXPRESSION 2. In addition, the mass of the cloud condensation nucleus, which does not change over elapsed time without the collision-coalescence, is explicitly expressed by $dM/dt=0$. Furthermore, the collision efficiency is given by $E_{jk}(R_j, R_k)$.

A temperature T and a charged electricity C can be added to the group of attributes of the super-particle. Then, it is possible to process a time evolution equation $dT/dt=\ldots$ of the temperature and a time evolution equation $dC/dt=\ldots$ of the charged electricity of the real-particle. In this case, it is required to define dependency (for instance, the collision easily or hardly occurs depending on the charged electricity) of the probabilities of collision-coalescence and collisional breakup on the attributes, that is, the collision efficiency $E_{jk}(R_j, M_j, T_j, C_j, R_k, M_k, T_k, C_k,$ fluid variables).

Moreover, in the case of simulating the cloud and the rainfall, the object to be processed are not limited to the real-water-droplet but enhanced to include snow, hail, and so on which are together regarded as a similar kind of real-particles for use of the super-particle-based model. For this purpose, an attribute G to specify the state of the real particle is added. For instance, when G=1, when G=2, and when G=3, the real-particle is respectively water, dendrite snow, and powder snow. Thus, the real-particles are classified in accordance with the attribute G. In this case, it is required to define a time evolution equation group $d\vec{A}/dt = \vec{F}(\vec{A})$ of the attributes including a time evolution of the attribute G (that is, how the water become dendrite snow, powder snow, or the like), the collision efficiency $E_{jk}(\vec{A}_j, \vec{A}_k$, fluid variables), and a change in the attribute G between before and after the collision-coalescence or the collisional breakup.

Next, there is described a case of processing the microbubble as the super-particle to calculate a behavior of the microbubble. The microbubble, which is a minuscule bubble, is regarded as the real-particle while water is regarded as the fluid for use of the super-particle-based model. A radius R of the bubble is assumed to be one of the group of attributes, and a velocity of the bubble is assumed to be a function of the radius R given by a terminal velocity where buoyancy and air resistance are in balance on the bubble. In this case, it is required to define the attribute R as a time evolution equation (an equation which expresses how the bubble grows, shrinks, and bursts) and the collision efficiency $E_{jk}(R_j, R_k)$.

Moreover, there is described a case of processing the dust as the super-particle to calculate a behavior of the dust, below. The dust is a minuscule powder or a coarse particulate (solid) and disperses in the air. Then, the dust is regarded as the real-particle while the air is regarded as the fluid for use of the super-particle-based model. It is assumed that the minuscule dusts coalesce with one another to form a large dust. In this case, it is required to define an equation of motion of dust (for instance, an equation which expresses that buoyancy and air resistance are in unbalance on a fairly large dust due to its own weight), a probability of collision-coalescence, and so on.

In addition, there is described a case of processing a droplet dispersion system (an emulsion system) as the super-particle-based system to calculate a behavior of the droplet dispersion system. The droplet dispersion system indicates a state where droplets are not affinity bound and disperse. Examples of the droplet dispersion system include water in which oil droplets are floating, simply, well mixed salad dressing, and emulsified fuel used in a heavy industry. The oil droplet is regarded as the real-particle while the water is regarded as the fluid for use of the super-particle-based model. In this case, it is required to define an equation of motion of oil droplet, a probability of collision-coalescence between the oil droplets, and so on.

Furthermore, there is described a case of processing a fuel droplet as the super-particle to calculate a behavior of the fuel droplet, so-called spray combustion. Here, the fuel droplet is regarded as the real-particle while mixed liquid of air and the fuel is regarded as the fluid for use of the super-particle-based model. For instance, an attribute group is expressed by $\vec{A} = (\vec{v}, r, T, q, q')$. Then, a velocity $\vec{v}$, an effective radius (a converted radius) r, a temperature T, a deformation ratio (a displacement from a sphere) q, and a time differential q' of the deformation ratio of the droplet are processed as the group of attributes. In this case, it is required to define a time evolution equation of attributes $d\vec{A}/dt = \vec{F}(\vec{A})$, a probability of collision-coalescence between the droplets, and so on.

The output 11a outputs results calculated by the calculator 13 in accordance with the data relating to the calculation time input through the input 3a, such as the time step (the time interval) and the total calculation time.

In the simulator 1A, the calculator 13 processes as the super-particle the plurality of real-particles which have the identical group of attributes in the divided space, and uses the super-particle-based model to calculate the behavior of the microbubble, the dust, the droplet dispersion system, and the fuel droplet. Thus, the real-particles are not processed as a distribution function. Therefore, even a large number of attributes of the real-particle does not greatly increase a computation time to calculate the time evolution (change over elapsed time) so that it is possible to predict a phenomenon with high accuracy.

Figure 17:
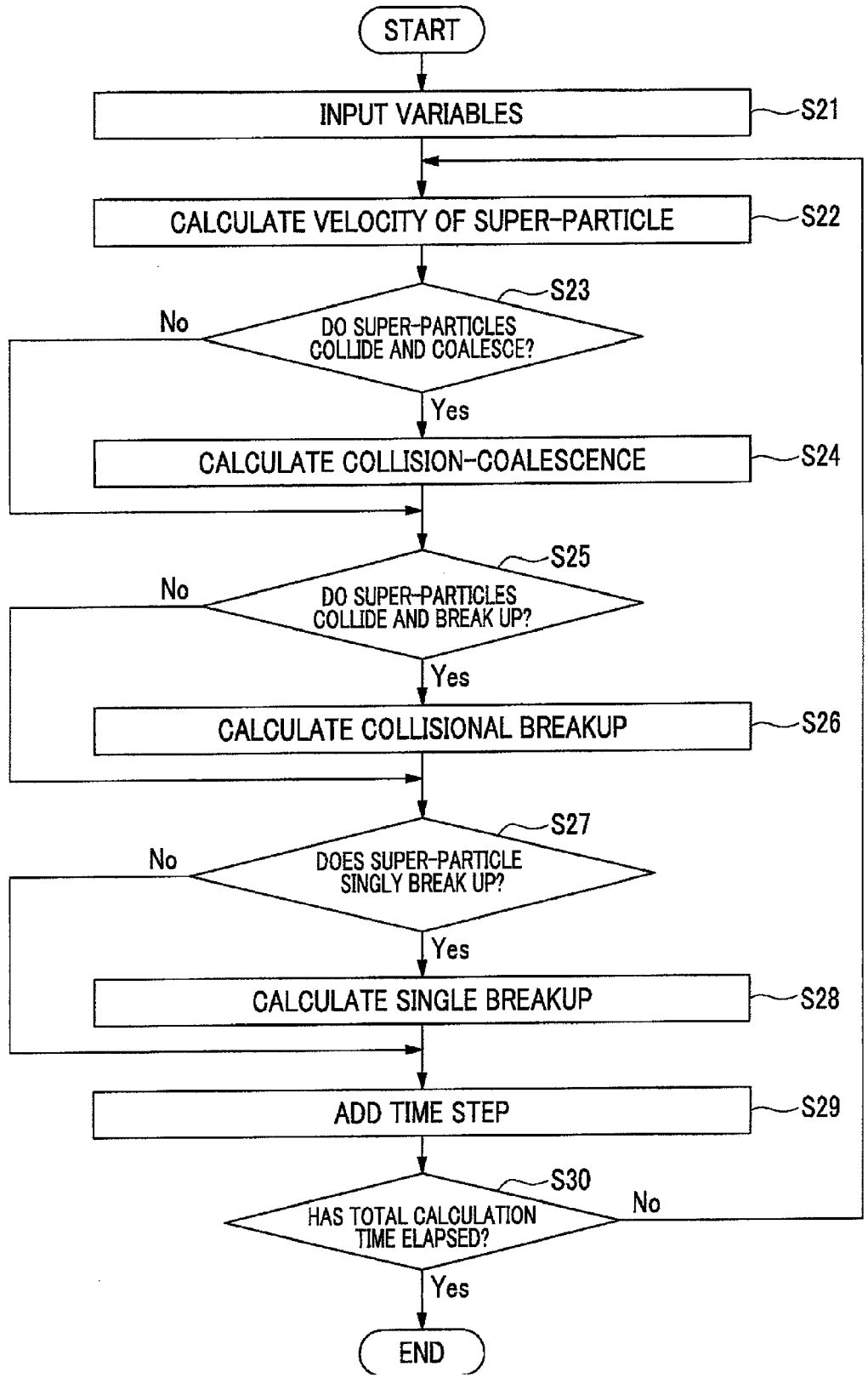
FIG. 17 is a flowchart showing operations of the simulator shown in FIG. 16.

Next, operations of the simulator 1A will be described referring to a flowchart shown in FIG. 17 (See FIG. 16, as needed). By the way, in the operation, updates of the attributes of the super-particle and the fluid field are performed as needed by the updater of attribute of super-particle 13b and the updater of fluid field 13d, and therefore will not be described, here.

First of all, in the simulator 1A, the initial variables are input through the input 3a. Then, various variables necessary for the operation of the simulator 1A are set (Step S21). Next, the simulator 1A stores the initial variables input through the input 3a into the data storage 5a.

Then, in the simulator 1A, the calculator of motion of super-particle 13a of the calculator 13 calculates the velocity of the super-particle (Step S22). After that, the simulator 1A examines whether the super-particles collide and coalesce with one another in the time step (Step S23). When the simulator 1A determines that the super-particles collide and coalesce with one another in the time step ("Yes" in Step S23), the calculator of collision-coalescence of super-particles 13c calculates about the collision-coalescence between the super-particles (Step S24). When the simulator 1A determines that the super-particles do not collide or coalesce with one another in the time step ("No" in Step S23), the operation proceeds to Step 25.

Subsequently, the simulator 1A examines whether the super-particles collide with one another and break up in the time step (Step S25). When the simulator 1A determines that the super-particles collide with one another and break up in the time step ("Yes" in Step S25), the calculator of collisional breakup of super-particles 13e calculates about the collisional breakup between the super-particles (Step S26). When the simulator 1A determines that the super-particles do not collide with one another or break up in the time step ("No" in Step S25), the operation proceeds to Step 27.

Moreover, the simulator 1A examines whether the super-particle singly breaks up in the time step (Step S27). When the simulator 1A determines that the super-particle singly breaks up in the time step ("Yes" in Step S27), the calculator of single breakup of super-particle 13f calculates about the single breakup of the super-particle (Step S28). When the simulator 1A determines that the super-particle does not singly break up in the time step ("No" in Step S27), the operation proceeds to Step 29.

Then, the simulator 1A adds the time step (Δt) to the current time to obtain an elapsed time (Step S29) and examines whether the elapsed time has reached the total calculation time (Step S30).

When the simulator 1A determines that the elapsed time has not reached the total calculation time ("No" in Step S30), the operation returns to Step S22 to continue. On the other hand, when the simulator 1 determines that the elapsed time has reached the total calculation time ("Yes" in Step S30), the operation ends.

(Prominent Difference from Related Art)

Next, there will be described how the present invention is remarkably different from the latest prior art, KIVA+enhanced NTC method (See D. P. Schmidt and C. J. Rutland, "A New Droplet Collision Algorithm", J. Comput. Phys., 164, 62-80 (2000)).

First of all, how to make pairs of collision-coalescences is remarkably different between the super-particle method (the super-water-droplet method) and the KIVA+enhanced NTC method. In the super-particle method, "[N/2]" pairs are combined from N super-particles in a certain divided space so that a pair to each super-particle is fixed not similarly to KIVA+enhanced NTC method.

In the super-particle method, it is possible to vectorize the operation of collision-coalescence in the numerical calculation in each of the divided spaces by virtue of the difference. Vectorization, which is a kind of a method to parallelize calculation in the numerical calculation, can remarkably improve computation efficiency (for instance, 256 times though depending on a type of a computer to be used). In the super-particle method, the "[N/2]" pairs are made in which the pair to each super-particle is fixed in such a way that the pairs of super-particles do not overlap. Accordingly, it is possible to vectorize the operation in the super-particle method. Meanwhile, in the KIVA+enhanced NTC method, it is impossible to vectorize the operation.

Moreover, the super-particle method (super-water-droplet method) is different from the KIVA+enhanced NTC method since a calculation efficiency is improved even in a case where a collision occurs for plural times.

The computation efficiency of the super-particle method may extremely exceed that of the KIVA+enhanced NTC method depending on a phenomenon to be simulated by virtue of the difference. For instance, in a case of simulating a phenomenon in which very big water-droplets and very small water-droplets coexist, probabilities of collision-coalescences between pairs of water-droplets greatly varies depending on sizes of the water-droplets so that a larger number of pairs of water-droplets collide for plural times. Therefore, the computation efficiency can be prominently different between the super-particle method and the KIVA+enhanced NTC method.

The embodiments of the invention have been described. However, the invention is not limited to the embodiments described above. The embodiment has been described as the simulator 1, for instance. However, a simulation program written in a general or special computer language can also realize operations performed by components of the simulator 1. In addition, the operations performed by the simulator 1 may correspond to steps included in a simulation method. Consequently, either of the simulation program or the simulation method achieves the same effects as the simulator 1.

According to the present invention, a plurality of real-particles which have an identical group of attributes within a certain volume in a space are calculated as a super-particle. Therefore, the real-particles are not processed as a distribution function. As a result, even a large number of attributes of the real-particle does not greatly increase a computation time so that it is possible to predict various natural phenomena with high accuracy.

According to the present invention, a plurality of real-water-droplets which have an identical group of attributes within a divided space are processed as a super-water-droplet. In addition, the super-water-droplet-based model is used as a cloud microphysics model. Therefore, the real-water-droplets are not processed as a distribution function. As a result, even a large number of attributes of the real-water-droplet does not greatly increase computation time of a cloud formation and a rainfall so that it is possible to predict various natural phenomena with high accuracy.

According to the present invention, a motion, a condensational growth, and a collision-coalescence of the super-water-droplet are calculated. As a result, it is possible to predict changes of the real-water-droplet over elapsed time with higher accuracy.

According to the present invention, the Monte Carlo method is used to calculate about the collision-coalescence of the super-water-droplet. As a result, it is possible to greatly reduce the computation time.

While the described embodiments represent the preferred forms of the present invention, it is to be distinctly understood that the invention is not limited thereto but may be otherwise variously embodied within the spirit and scope of the following claims.

What is claimed is:

1. A simulation method for simulating a real-particle for an arbitrary simulation time in an observation space in which a plurality of real-particles collide with one another by a certain probability within a volume of a predetermined cell in a predetermined time interval, and in which the real-particle is specified by a group of an arbitrary number of attributes including a velocity at an initial time, and position coordinates in the observation space at the initial time, and in which a real-particle is filled with fluid which is characterized by an arbitrary number of fluid field variables expressed by functions of a time elapsed from the initial time and the observation space, the simulation method comprising:

using a computer to execute the method steps, comprising:

inputting, as initial variables, the initial time, the volume, the field variables, a group of attributes of a super-particle, a total number of super-particles, and a velocity of the super-particle, position coordinates of the super-particle, the super-particle representing a group of an arbitrary number of the real-particles which have a predetermined identical group of the arbitrary number of attributes describing the physical quantities of each of the plurality of the real-particles;

calculating, based on the input initial variables:

a motion of the real-particle using a time evolution equation of attributes over the time in accordance with the volume, the velocity, the position coordinates and the field variables, where a time evolution equation of position coordinates determines the relationship between the velocity and the position coordinates of the real-particle;

the group of attributes, a multiplicity, and the total number of the super-particles after the super-particles collide with one another using a Monte Carlo calculation, where the multiplicity is the arbitrary number of the real-particles represented by the super-particle changing when the super-particle collides with another super-particle by a probability which is specified based on the certain probability by which the real-particles collide with one another within the volume in the predetermined time interval and the multiplicity of the super-particle; and a change in the fluid of the real-particle using a time evolution equation of fluid field in accordance with the fluid field variables, the group of attributes, the velocity, the position coordinates, and the multiplicity of the super-particle, and the total number of the super-particles; and outputting, after repeating the calculation until the arbitrary simulation time elapses, results of repeating the calculation step including the group of attributes, the velocity, and the position coordinates of the real-particle, a total number of the real-particles, and the fluid field variables.

2. The simulation method as claimed in claim 1, wherein the plurality of real-particles which have an identical group of attributes within a volume in a space are not processed as a distribution function so that computation time associated with processing the plurality of the real-particles is reduced and processing accuracy is enhanced.

3. The simulation method as claimed in claim 1, wherein the predetermined identical group of attributes includes at least one of a size, a quantity, a type of a cloud condensation nucleus, an electric charge, a velocity, a temperature of a real-particle.

4. A computer readable storage medium storing a simulation program for causing a computer to simulate a real-particle for an arbitrary simulation time in an observation space in which a plurality of real-particles collide with one another by a certain probability within a volume of a predetermined cell in a predetermined time interval, and in which the real-particle is specified by a group of an arbitrary number of attributes including a velocity at an initial time, and position coordinates in the observation space at the initial time, and in which a real-particle is filled with fluid which is characterized by an arbitrary number of fluid field variables expressed by functions of a time elapsed from the initial time and the observation space, the simulation program for causing the computer to function as:

an input for inputting, as initial variables, the initial time, the volume, the field variables, a group of attributes of a super-particle, a total number of super-particles, and a velocity of the super-particle, position coordinates of the super-particle, the super-particle representing a group of an arbitrary number of the real-particles which have a predetermined identical group of the arbitrary number of attributes describing the physical quantities of each of the plurality of the real-particles;

a calculator for calculating, based on the input initial variables a motion of the real-particle using a time evolution equation of attributes over the time in accordance with the volume, the velocity, the position coordinates and the field variables, where a time evolution equation of position coordinates determines the relationship between the velocity and the position coordinates of the real-particle;

the group of attributes, a multiplicity, and the total number of the super-particles after the super-particles collide with one another using a Monte Carlo calculation, where the multiplicity is the arbitrary number of the real-particles represented by the super-particle changing when the super-particle collides with another super-particle by a probability which is specified based on the certain probability by which the real-particles collide with one another within the volume in the predetermined time interval and the multiplicity of the super-particle; and a change in the fluid of the real-particle using a time evolution equation of fluid field in accordance with the fluid field variables, the group of attributes, the velocity, the position coordinates, and the multiplicity of the super-particle, and the total number of the super-particles; and an output for outputting, after repeating the calculation by the calculator until the arbitrary simulation time elapses, results of repeating the calculation by the calculator including the group of attributes, the velocity, the position coordinates, and the multiplicity of the real-particle, a total number of the real-particles, and the fluid field variables.

5. A simulator, implemented by a computer, for simulating a real-particle for an arbitrary simulation time in an observation space in which a plurality of real-particles collide with one another by a certain probability within a volume of a predetermined cell in a predetermined time interval, and in which the real-particle is specified by a group of an arbitrary number of attributes including a velocity at an initial time, and position coordinates in the observation space at the initial time, and in which a real-particle is filled with fluid which is characterized by an arbitrary number of fluid field variables expressed by functions of a time elapsed from the initial time and the observation space, the simulator comprising:

an input for inputting, as initial variables, the initial time, the volume, the field variables, a group of attributes of a super-particle, a total number of super-particles, and a velocity of the super-particle, position coordinates of the super-particle, the super-particle representing a group of an arbitrary number of the real-particles which have a predetermined identical group of the arbitrary number of attributes describing the physical quantities of each of the plurality of the real-particles;

a calculator for calculating, based on the input initial variables a motion of the real-particle using a time evolution equation of attributes over the time in accordance with the volume, the velocity, the position coordinates and the field variables, where a time evolution equation of position coordinates determines the relationship between the velocity and the position coordinates of the real-particle;

the group of attributes, a multiplicity, and the total number of the super-particles after the super-particles collide with one another using a Monte Carlo calculation, where the multiplicity is the arbitrary number of the real-particles represented by the super-particle changing when the super-particle collides with another super-particle by a probability which is specified based on the certain probability by which the real-particles collide with one another within the volume in the predetermined time interval and the multiplicity of the super-particle; and a change in the fluid of the real-particle using a time evolution equation of fluid field in accordance with the fluid field variables, the group of attributes, the velocity, the position coordinates, and the multiplicity of the super-particle, and the total number of the super-particles; and an output for outputting, after repeating calculation by the calculator until the arbitrary simulation time elapses, results of repeating the calculation by the calculator including group of attributes, the velocity, the position coordinates, and the multiplicity of the real-particle, a total number of the real-particles, and the fluid field variables.

6. A simulation method for simulating a real-water-droplet for an arbitrary simulation time in an entire space to be observed in which a plurality of real-water-droplets collide with one another by a certain probability within a predetermined volume in a predetermined time interval, and in which the real-water-droplet is specified by a group of an arbitrary number of attributes and position coordinates at an initial time in one of divided spaces into which the entire space is divided, the simulation method comprising:

using a computer to execute the method steps, comprising:

inputting, as initial variables, the initial time, a volume of the entire space, a volume of the divided space, a group of attributes of a super-water-droplet, a total number of super-water-droplets, position coordinates of the super-water-droplet, and ambient condition data which are data relating to ambient conditions of the real-water-droplet in the divided space, the super-water-droplet representing a group of an arbitrary number of the real-water-droplets which have a predetermined identical group of the arbitrary number of attributes describing the physical quantities of each of the plurality of the real-water-droplets;

calculating using a microphysics model, based on the initial variables:

changes of the position coordinates of the super-water-droplet caused by a motion of the super-water-droplet in the entire space;

a change of a volume of liquid water caused by a condensational growth of the super-water-droplet;

changes of the group of attributes and a multiplicity of the super-water-droplet and the total number of the super-water-droplets caused by a collision-coalescence between the super-water-droplets, where the multiplicity is the arbitrary number of the real-water-droplets represented by the super-water-droplet changing when the super-water-droplet collides with another super-water-droplet by a probability which is specified based on the certain probability by which the real-water-droplets collide with one another within the volume in the predetermined time interval; and a mass of the real-water-droplet based on the changes of the super-water-droplet, and amounts of interaction from the super-water-droplet to an atmosphere based on the mass of the real-water-droplet;

calculating using a fluid dynamics model, based on the calculated amounts of interaction and the ambient condition data, a fluid dynamics process of the atmosphere in which the real-water-droplet exists, and feeding back the calculated fluid dynamics process of the atmosphere to the calculation of the microphysics model; and outputting, after repeating the calculation of the microphysics model and the calculation of the fluid dynamics model until the arbitrary simulation time elapses, results of repeating the calculation including data relating to the real-water-droplet and the ambient condition data.

7. A computer readable storage medium storing a simulation program for causing a computer to simulate a real-water-droplet for an arbitrary simulation time in an entire space to be observed in which a plurality of real-water-droplets collide with one another by a certain probability within a predetermined volume in a predetermined time interval, and in which the real-water-droplet is specified by a group of an arbitrary number of attributes and position coordinates at an initial time in one of divided spaces into which the entire space is divided, the simulation program for causing a computer to function as:

an input for inputting, as initial variables, the initial time, a volume of the entire space, a volume of the divided space, a group of attributes of a super-water-droplet, a total number of super-water-droplets, position coordinates of the super-water-droplet, and ambient condition data which are data relating to ambient conditions of the real-water-droplet in the divided space, the super-water-droplet representing a group of an arbitrary number of the real-water-droplets which have a predetermined identical group of the arbitrary number of attributes describing the physical quantities of each of the plurality of the real-water-droplets;

a calculator of microphysics model for calculating, based on the initial variables:

changes of the position coordinates of the super-water-droplet caused by a motion of the super-water-droplet in the entire space;

a change of a volume of liquid water caused by a condensational growth of the super-water-droplet;

changes of the group of attributes and a multiplicity of the super-water-droplet and the total number of the super-water-droplets caused by a collision-coalescence between the super-water-droplets, where the multiplicity is the arbitrary number of the real-water-droplets represented by the super-water-droplet changing when the super-water-droplet collides with another super-water-droplet by a probability which is specified based on the certain probability by which the real-water-droplets collide with one another within the volume in the predetermined time interval; and a mass of the real-water-droplet based on the changes of the super-water-droplet, and amounts of interaction from the super-water-droplet to an atmosphere based on the mass of the real-water-droplet;

a calculator of fluid dynamics model for calculating, based on the calculated amounts of interaction and the ambient condition data, a fluid dynamics process of the atmosphere in which the real-water-droplet exists, and feeding back the calculated fluid dynamics process of the atmosphere to the calculation of the microphysics model; and an output for outputting, after repeating the calculation of the microphysics model and the calculation of the fluid dynamics model until the arbitrary simulation time elapses, results of repeating the calculation including data relating to the real-water-droplet and the ambient condition data.

8. The computer readable storage medium as claimed in claim 7, wherein the calculator of microphysics model comprises:

a calculator of motion of super-water-droplet for calculating a terminal velocity of the super-water-droplet assuming that in a state where a gravity and an air resistance are in balance on the super-water-droplet, wherein motion of the super-water-droplet changes in accordance with a wind velocity, and the super-water-droplet moves at the terminal velocity which is relatively constant with respect to the wind velocity;

a calculator of condensational growth of super-water-droplet for calculating a volume of liquid water assuming that the volume of liquid water contained in the super-water-droplet changes in accordance with a humidity included in the ambient condition data; and a calculator of collision-coalescence of super-water-droplets for calculating the group of attributes, the multiplicity of the super-water-droplet and the total number of the super-water-droplets after the collision-coalescence between the super-water-droplets as a collision-coalescence process by making a predetermined number of pairs of the super-water-droplets which collide with one another, the predetermined number being decreased from a number of all possible combinations of pairs of the super-water-droplets, and by using a probability that each of the predetermined number of pairs of the super-water-droplets collide with one another, the probability being increased by a predetermined width from a probability that each of the all possible combinations of pairs of the super-water-droplets collide with one another.

9. The computer readable storage medium as claimed in claim 8,
wherein the calculator of collision-coalescence of super-water-droplets calculates the collision-coalescence process in accordance with a numerical simulation using a Monte Carlo method.

10. A simulator, implemented by a computer, for simulating a real-water-droplet for an arbitrary simulation time in an entire space to be observed in which a plurality real-water-droplets collide with one another by a certain probability within a predetermined volume in a predetermined time interval, and in which the real-water-droplet is specified by a group of an arbitrary number of attributes and position coordinates at an initial time in one of divided spaces into which the entire space is divided, the simulator comprising:
 an input for inputting, as initial variables, the initial time, a volume of the entire space, a volume of the divided space, a group of attributes of a super-water-droplet, a total number of super-water-droplets, position coordinates of the super-water-droplet, and ambient condition data which are data relating to ambient conditions of the real-water-droplet in the divided space, the super-water-droplet representing a group of an arbitrary number of the real-water-droplets which have a predetermined identical group of the arbitrary number of attributes describing the physical quantities of each of the plurality of the real-water-droplets;
 a calculator of microphysics model for calculating, based on the based on the initial variables:
  changes of the position coordinates of the super-water-droplet caused by a motion of the super-water-droplet in the entire space;
  a change of a volume of liquid water caused by a condensational growth of the super-water-droplet;
  changes of the group of attributes and a multiplicity of the super-water-droplet and the total number of the super-water-droplets caused by a collision-coalescence between the super-water-droplets, where the multiplicity is the arbitrary number of the real-water-droplets represented by the super-water-droplet changing when the super-water-droplet collides with another super-water-droplet by a probability which is specified based on the certain probability by which the real-water-droplets collide with one another within the volume in the predetermined time interval; and
  a mass of the real-water-droplet based on the changes of the super-water-droplet, and amounts of interaction from the super-water-droplet to an atmosphere based on the mass of the real-water-droplet;
 a calculator of fluid dynamics model for calculating, based on the amounts of calculated interaction and the ambient condition data, a fluid dynamics process of the atmosphere in which the real-water-droplet exists, and feeding back the calculated fluid dynamics process of the atmosphere to the calculator of microphysics model; and
 an output for outputting, after repeating calculation by the calculator of microphysics model and the calculator of fluid dynamics model until the arbitrary simulation time elapses, results of repeating the calculation by the calculator of microphysics model and the calculator of fluid dynamics model including data relating to the real-water-droplet and ambient condition data.

11. The simulator as claimed in claim 10,
wherein the calculator of microphysics model comprises:
 a calculator of motion of super-water-droplet for calculating a terminal velocity of the super-water-droplet assuming that in a state where a gravity and an air resistance are in balance on the super-water-droplet, wherein in motion of the super-water-droplet changes in accordance with a wind velocity, and the super-water-droplet moves at the terminal velocity which is relatively constant with respect to the wind velocity;
 a calculator of condensational growth of super-water-droplet for calculating a volume of liquid water assuming that the volume of liquid water of the super-water-droplet changes in accordance with a humidity included in the ambient condition data; and
 a calculator of collision-coalescence of super-water-droplets for calculating the group of attributes; the multiplicity of the super-water-droplet and the total number of the super-water-droplets after the collision-coalescence between the super-water-droplets as a collision-coalescence process by making a predetermined number of pairs of the super-water-droplets which collide with one another, the predetermined number being decreased from a number of all possible combinations of pairs of the super-water-droplets, and by using a probability that each of the predetermined number of pairs of the super-water-droplets collide with one another, the probability being increased by a predetermined width from a probability that each of the all possible combinations of pairs of the super-water-droplets collide with one another.

12. The simulator as claimed in claim 11,
wherein the calculator of collision-coalescence of super-water-droplets calculates the collision-coalescence process in accordance with a numerical simulation using a Monte Carlo method.

* * * * *

UNITED STATES PATENT AND TRADEMARK OFFICE
CERTIFICATE OF CORRECTION

PATENT NO. : 7,756,693 B2  Page 1 of 1
APPLICATION NO. : 11/737020
DATED : July 13, 2010
INVENTOR(S) : Shinichiro Shima et al.

It is certified that error appears in the above-identified patent and that said Letters Patent is hereby corrected as shown below:

Claim 10, column 47, lines 36-37, after "based on the," delete "based on the".

Signed and Sealed this

Ninth Day of November, 2010

David J. Kappos
*Director of the United States Patent and Trademark Office*